(12) United States Patent
Yoshino et al.

(10) Patent No.: US 7,107,140 B2
(45) Date of Patent: Sep. 12, 2006

(54) INTERNAL COMBUSTION ENGINE CONTROL APPARATUS

(75) Inventors: Takahiro Yoshino, Yokosuka (JP); Hatsuo Nagaishi, Zushi (JP); Masahiro Arai, Yokohama (JP); Shunichi Yoshikawa, Yokohama (JP); Mitsuhiko Kubota, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/240,641

(22) Filed: Oct. 3, 2005

(65) Prior Publication Data

US 2006/0075996 A1  Apr. 13, 2006

(30) Foreign Application Priority Data

Oct. 8, 2004  (JP) .............................. 2004-296620
Oct. 8, 2004  (JP) .............................. 2004-296621
Oct. 8, 2004  (JP) .............................. 2004-296627

(51) Int. Cl.
*F02D 45/00* (2006.01)
*G01F 17/00* (2006.01)
(52) U.S. Cl. .................... 701/102; 123/90.15
(58) Field of Classification Search ........ 701/102, 701/114, 115; 123/90.15, 90.17
See application file for complete search history.

(56) References Cited

U.S. PATENT DOCUMENTS

| | | | |
|---|---|---|---|
| 5,549,080 A | * | 8/1996 | Uchikawa ................ 123/90.16 |
| 6,328,007 B1 | | 12/2001 | Hirasawa et al. |
| 6,701,244 B1 | | 3/2004 | Oota et al. |
| 6,863,050 B1 | * | 3/2005 | Iizuka et al. ................ 123/345 |

FOREIGN PATENT DOCUMENTS

| | | | |
|---|---|---|---|
| JP | 2001-050091 | | 2/2001 |
| JP | 2002-256938 | | 9/2002 |
| JP | 2006-22708 | * | 1/2006 |

* cited by examiner

*Primary Examiner*—Hieu T. Vo
(74) *Attorney, Agent, or Firm*—Global IP Counselors

(57) ABSTRACT

An internal combustion engine control apparatus basically comprises a reference intake air quantity calculating section, a maximum intake air quantity calculating section and an engine control section. The reference intake air quantity calculating section is configured to calculate a reference intake air quantity corresponding to when an intake air is taken in as a sonic flow. The maximum intake air quantity calculating section is configured to calculate a theoretical maximum intake air quantity. The engine control section is configured to control the engine by using an intake air quantity function between a first value obtained by dividing the reference intake air quantity by the maximum intake air quantity and a second value obtained by dividing an actual intake air quantity corresponding to the valve characteristics of the intake valve by the maximum intake air quantity.

23 Claims, 10 Drawing Sheets

INTERNAL COMBUSTION ENGINE CONTROL APPARATUS

CROSS-REFERENCE TO RELATED APPLICATIONS

This application claims priority under 35 U.S.C. §119 to Japanese Patent Application Nos. 2004-296620, 2004-296621 and 2004-296627. The entire disclosures of Japanese Patent Application Nos. 2004-296620, 2004-296621 and 2004-296627 are hereby incorporated herein by reference.

BACKGROUND OF THE INVENTION

1. Field of the Invention

The present invention generally relates to an internal combustion engine control apparatus configured to estimate an intake air quantity drawn into a cylinder of an engine. More specifically, the present invention relates to an internal combustion engine control apparatus configured to estimate an actual cylinder intake air quantity in a simple manner in an engine configured to control a cylinder intake air quantity by varying the valve timing of intake valves.

2. Background Information

Conventional gasoline engines are provided with a throttle valve for controlling the intake air quantity, and the amount of air that passes through the throttle valve is measured with an airflow meter provided upstream of the throttle valve. In such conventional engines, the measured amount of air that passed through the throttle valve is generally used as a load indicator, which is used as a parameter for controlling the engine. For example, Japanese Laid-Open Patent Publication No. 2002-256938 discloses a conventional internal combustion engine control apparatus in which an intake air quantity of an internal combustion engine (a gasoline engine) is controlled using a throttle valve to achieve a target torque. In the above mentioned reference, the quantity of intake air that passes through the throttle valve is estimated and the estimated intake air quantity is used as a load indicator for setting the target torque.

In other type of conventional engines, the amount of air that flows into the cylinder (hereinafter called "cylinder intake air quantity") is measured instead of the amount of air that passes through the throttle valve so that the cylinder intake air quantity is used as a load indicator. For example, Japanese Laid-Open Patent Publication No. 2001-050091 discloses this type of conventional engine that is configured to calculate the amount of air that flows into the intake manifold based on the output of an airflow meter, and to calculate the cylinder intake air quantity and the amount of air inside the intake manifold based on the difference between the detected amount of air that flows into the intake manifold and an amount of air (the cylinder intake air quantity) that flows from the intake manifold into the cylinder.

In view of the above, it will be apparent to those skilled in the art from this disclosure that there exists a need for an improved internal combustion engine control apparatus. This invention addresses this need in the art as well as other needs, which will become apparent to those skilled in the art from this disclosure.

SUMMARY OF THE INVENTION

In recent years, technologies have been disclosed whereby the intake air quantity (i.e., the cylinder intake air quantity) is controlled by variably controlling the operating characteristics of the intake valves in addition to controlling the throttle valve. In other words, the intake air quantity is controlled by variably controlling the operating characteristics (e.g., valve timing and valve lift amount) of the intake valves to eliminate throttle loss of the throttle valve and to improve the fuel efficiency. In those conventional engines too, when the intake air quantity is controlled to achieve a target torque, the quantity of intake air that passes through the intake valves into the cylinders (the cylinder intake air quantity) needs to be estimated and used as a load indicator for setting the target torque in a manner similar to when throttle valve control is controlled to control the cylinder intake air quantity. When an engine is controlled based the cylinder intake air quantity, a load indicator can be provided for each intake stroke of each individual cylinder, and a target torque can be realized for each individual cycle (this cannot be done when the engine is controlled based on the amount of air passing through the throttle valve). As a result, the engine output can be controlled very precisely when the operating conditions are transient.

However, when the cylinder intake air quantity is controlled by varying the operation characteristics of the intake valves, the cylinder intake air quantity varies greatly depending on the valve timing and the valve lift amount. Thus, a large number of parameters are required to estimate the cylinder intake air quantity. If a large number of maps (including higher dimensional maps) are used to accommodate the increase in parameters, a huge ROM capacity is required and number of adaptation steps becomes enormous, making the control method impractical to employ.

Moreover, the cylinder intake air quantity is greatly affected by intake air pulsation, and thus, there is a demand for a technology that can measure the cylinder intake air quantity in a simple manner while taking into account the effect of intake air pulsation.

The present invention was conceived in view of this issue. One object of the present invention is to provide an internal combustion engine control apparatus configured to control the intake air quantity using the intake valves, the control apparatus being configured such that it can estimate the cylinder intake air quantity with a minimum amount of computations without using a large number of maps, thereby suppressing the ROM capacity and number of adaptation steps.

Another object of the preset invention is to provide an internal combustion engine control apparatus that is configured to measure the cylinder intake air quantity in a simple manner while taking into account the effect of intake air pulsation.

In order to achieve the above mentioned objects and other objects of the present invention, an internal combustion engine control apparatus is provided for an engine having a variable valve operating mechanism configured and arranged to vary valve characteristics of an intake valve of the engine. The internal combustion engine control apparatus basically comprises a reference intake air quantity calculating section, a maximum intake air quantity calculating section and an engine control section. The reference intake air quantity calculating section is configured to calculate a reference intake air quantity corresponding to when an intake air is taken in a cylinder as a sonic flow with an intake valve opening area corresponding to the valve characteristics of the intake valve. The maximum intake air quantity calculating section is configured to calculate a theoretical maximum intake air quantity corresponding to when a cylinder stroke volume from a start timing to an end timing of an intake stroke is filled with intake air at an intake air pressure existing upstream of the intake valve. The engine control section is configured to control the engine by using an intake air quantity function between a first value obtained by dividing the reference intake air quantity by the maximum intake air quantity and a second value obtained by dividing an actual intake air quantity corresponding to the valve characteristics of the intake valve by the maximum intake air quantity. The engine control section is configured to uniquely determine each value of the first value with respect to the second value and to uniquely determine each value of the second value with respect to first value.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
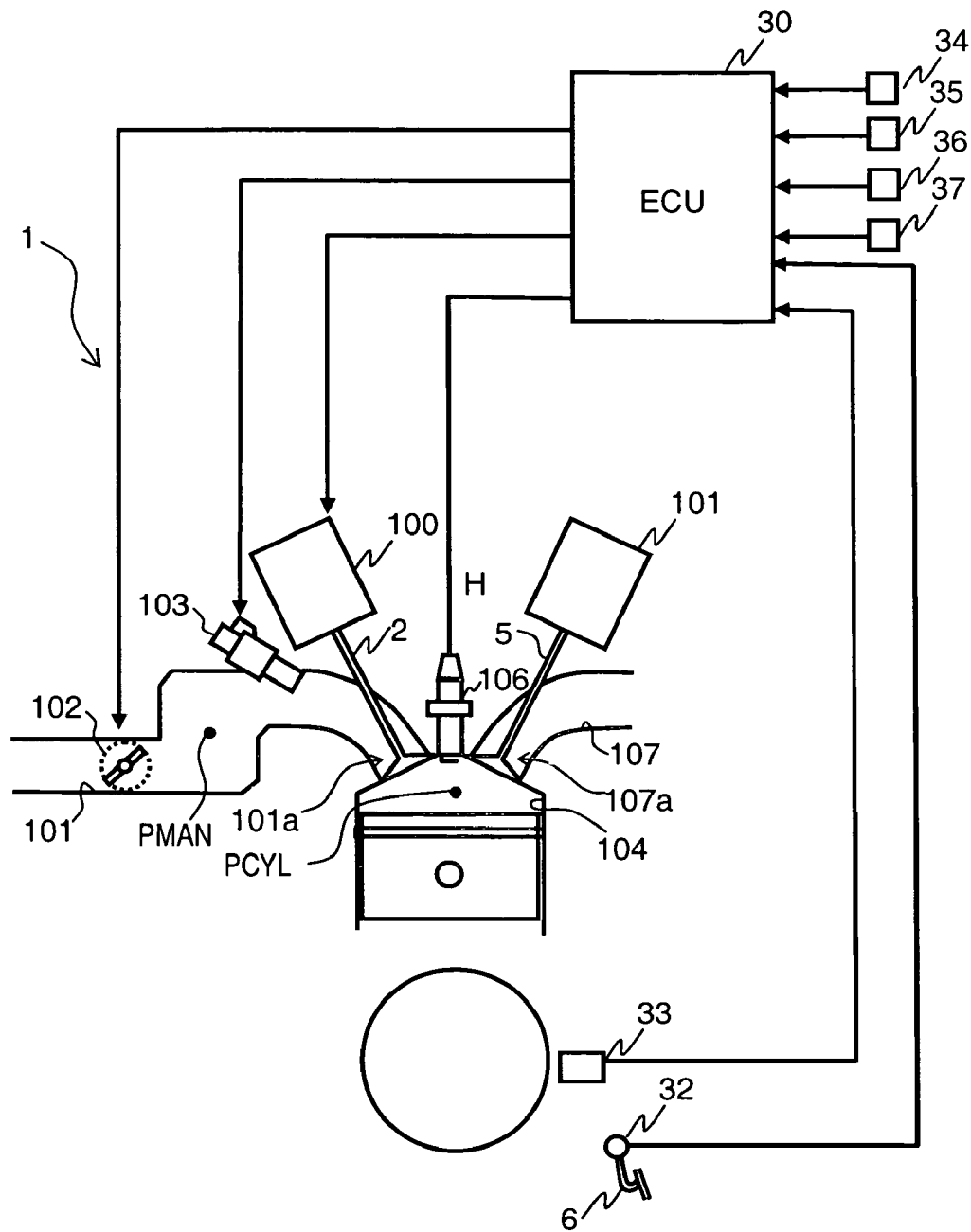
FIG. 1 is an overall schematic view of an internal combustion engine control apparatus in accordance with a preferred embodiment of the present invention.

Referring initially to FIG. 1, an internal combustion engine control apparatus equipped in an internal combustion engine 1 (e.g., a spark ignition engine) is illustrated in accordance with a preferred embodiment of the present invention. The engine 1 preferably includes an electronically controlled throttle valve 102 provided in an air intake passage 101 thereof as seen in FIG. 1. A pair of intake valves 2 (only one shown in FIG. 1) is preferably provided in each cylinder 104 of the engine 1. Although the amount of intake air drawn into the air intake passage 101 can be controlled by controlling opening and closing of the throttle valve 102, the intake air quantity is preferably controlled chiefly by controlling the valve timing of the intake valves in the preferred embodiment of the present invention. The throttle valve 102 is used to control the intake air pressure PMAN as required in order to accomplish the valve timing control of the engine 1. The engine 1 is also provided with a fuel injector 103 installed in the intake passage 101. The fuel injector 103 is controlled so as to inject the amount of fuel required to achieve a prescribed equivalence ratio based on the intake air quantity achieved with the valve timing control.

Each of the intake valves 2 is preferably a poppet type intake valve and is arranged in an intake port portion 101a of the air intake passage 101. The intake valves 2 are driven by a variable valve operating mechanism (hereinafter called "intake valve operating mechanism") 100 arranged above the intake valves 2 so that a mixture of intake air and fuel is directed into the cylinder 104 of the engine 1 during the period when the intake valves 2 are open. In the preferred embodiment of the present invention, the intake valve operating mechanism 100 is configured to vary (change) the working angle (hereinafter called "intake valve working angle") and the lift amount of the intake valves 2 in a continuous manner, and also to vary the center phase of the intake valve working angle (hereinafter called "working center angle") in a continuous manner.

A cylinder head H is provided on the main body of the engine 1 and a spark plug 106 is installed in the cylinder head H such that the tip thereof faces toward a central upper portion of the combustion chamber. The spark plug 106 is configured and arranged to ignite the fuel-air mixture that is introduced into the cylinder 104.

After combustion, the exhaust gas generated during combustion is discharged to an exhaust passage 107. A pair of poppet type exhaust valves 108 (only one shown in FIG. 1) is preferably arranged in an exhaust port section 107a of the exhaust passage 107. The exhaust valves 108 are driven by a valve operating mechanism (hereinafter called "exhaust valve operating mechanism") 101 arranged above the exhaust valves 108 such that the exhaust gas is discharged to the exhaust passage 107 during the period when the exhaust valves 108 are open. In the preferred embodiment of the present invention, the working angle, the lift amount, and the working center angle of the exhaust valve 108 are all fixed. However, it will be apparent to those skilled in the art from this disclosure that the engine 1 can be arranged such that the exhaust valve operating mechanism 101 is configured and arranged to vary the working angle and other valve characteristics of the exhaust valves 108 in the same manner as the intake valve operating mechanism 100 controls the valve characteristics of the intake valves 2 by employing a mechanism similar to the intake valve operating mechanism 100 or another conventional variable valve operating mechanism.

The engine 1 is also provided with an engine control unit (ECU) 30 that comprises an electronic control unit. The ECU 30 is configured to control the operation of the intake valve operating mechanism 100 and the throttle valve 102. The ECU 30 is preferably operatively coupled to an accelerator sensor 32, a crank angle sensor 33, an intake pressure sensor 34, an intake temperature sensor 35, an exhaust pressure sensor 36, an exhaust temperature sensor 37 and the like. The ECU 30 is configured to receive a detection signal from the accelerator sensor 32 indicative of a depression amount (accelerator position APO) of an accelerator pedal 6, a detection signal from the crank angle sensor 33 indicative of a rotational position of a crankshaft (the engine rotational speed Ne is calculated based on this signal), a detection signal from the intake pressure sensor 34 indicative of an intake air pressure PMAN inside the air intake passage 101 (inside a surge tank in this embodiment) corresponding to a pressure in the intake manifold upstream of the intake valves 2, a detection signal from the intake temperature sensor 35 indicative of a temperature TMAN inside the air intake passage 101 corresponding to a temperature in the intake manifold upstream of the intake valves 2, a detection signal from the exhaust pressure sensor 36 indicative of an exhaust pressure PE inside the exhaust passage 107, and a detection signal from the exhaust temperature sensor 37 indicative of an exhaust temperature TE inside the exhaust passage 107. Based on the detection signals, the ECU 30 is configured to control the intake valve working angle and the working center angle of the intake valves 2 by the intake valve operating mechanism 100 and to control the opening degree of the throttle valve 102. In the preferred embodiment of the present invention, the ECU 30 constitutes an internal combustion engine control apparatus. As part of the throttle opening control, the ECU 30 is configured to calculate an intake air quantity QCYL that corresponds to the amount of air actually drawn into the cylinder 104.

More specifically, the ECU 30 preferably includes a microcomputer with an intake air quantity estimation control program that controls the calculation of the intake air quantity as discussed below. The ECU 30 can also include other conventional components such as an input interface circuit, an output interface circuit, and storage devices such as a ROM (Read Only Memory) device and a RAM (Random Access Memory) device. The microcomputer of the ECU 30 is programmed to control the various components of the engine 1. The memory circuit stores processing results and control programs such as ones for intake air quantity estimation operation that are run by the processor circuit. The ECU 30 is operatively coupled to the various sensors mentioned above and other components of the engine 1 in a conventional manner. The internal RAM of the ECU 30 stores statuses of operational flags and various control data. The internal ROM of the ECU 30 stores the data and maps for various operations. The ECU 30 is capable of selectively controlling any of the components of the control system in accordance with the control program. It will be apparent to those skilled in the art from this disclosure that the precise structure and algorithms for the ECU 30 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 2:
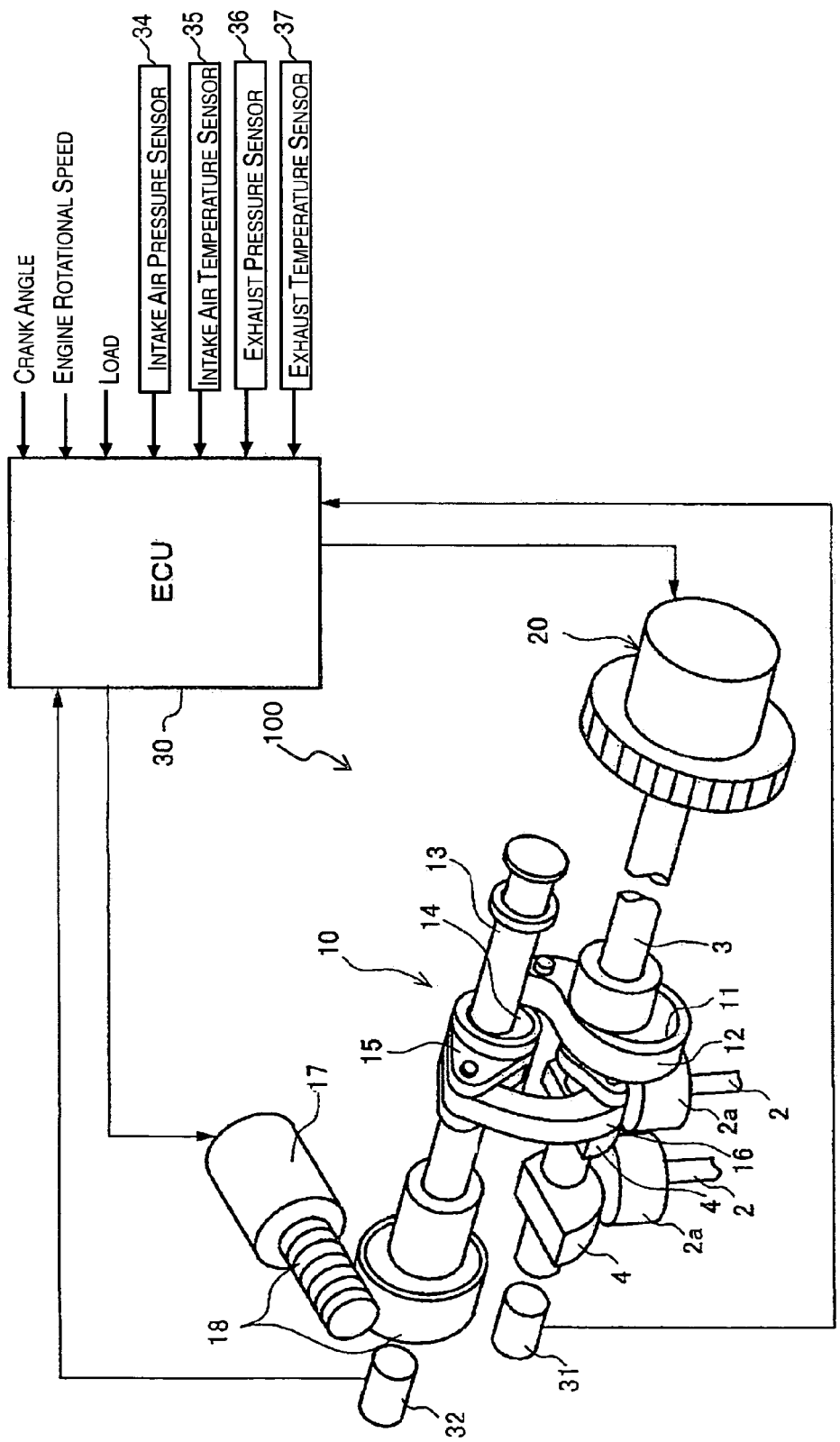
FIG. 2 is a perspective view of a variable valve operating mechanism of an internal combustion engine in accordance with the preferred embodiment of the present invention.

FIG. 2 is a perspective view of the intake valve operating mechanism 100 in accordance with the present invention. As seen in FIG. 2, one pair of the intake valves 2 are preferably provided on each cylinder 104 and a hollow intake valve drive shaft 3 is arranged above the intake valves 2 so as to extend along the direction in which the cylinders 104 are arranged. A plurality of rocking cams 4 are arranged on the intake valve drive shaft 3 such that they can be rotated relative to the intake valve drive shaft 3. The rocking cams 4 are configured to open and close the intake valves 2 by touching against a valve lifter 2a of each intake valve 2.

The intake valve operating mechanism 100 preferably comprises an electromotive working angle varying mechanism 10 and an electromotive phase varying mechanism 20. The working angle varying mechanism 10 is disposed between the intake valve drive shaft 3 and the rocking cams 4, and is configured to change the intake valve working angle (i.e., the working angle of the intake valves 2) and the valve lift amount in a continuously variable manner. The phase varying mechanism 20 is disposed on one end of the intake valve drive shaft 3, and is configured to change an intake center phase or the intake working center angle (i.e., the center phase of the intake valve working angle) in a continuously variable manner by changing the phase of the intake valve drive shaft 3 with respect to a crankshaft (not shown).

Figure 3:
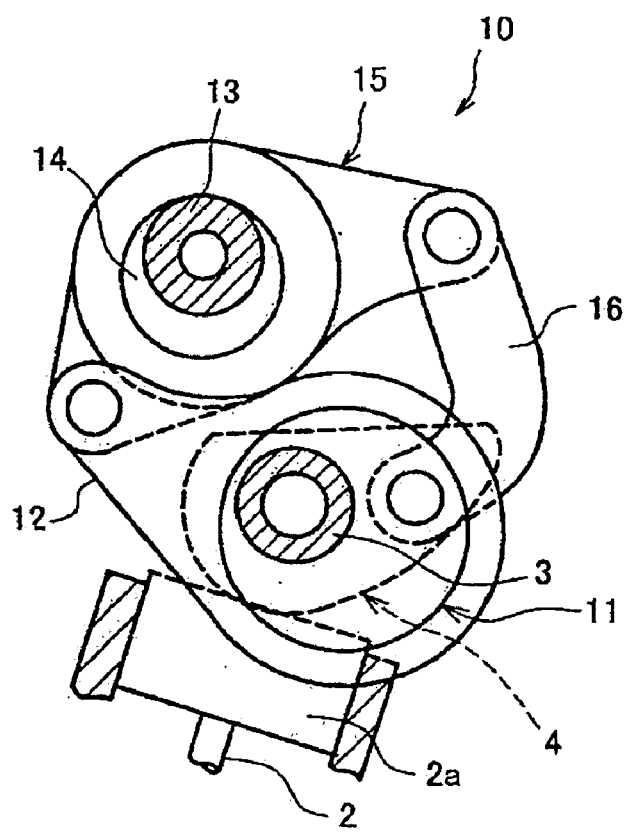
FIG. 3 is an enlarged partial side view of a working angle varying mechanism of the variable valve operating mechanism illustrated in FIG. 2 in accordance with the preferred embodiment of the present invention.

As shown in FIGS. 2 and 3, the working angle varying mechanism 10 preferably includes a circular drive cam 11, a ring shaped link 12, a control shaft 13, a circular control cam 14, a rocker arm 15 and a rod-shaped link 16. The circular drive cam 11 is fixed to the intake valve drive shaft 3 in an eccentric manner. The ring-shaped link 12 is fitted onto the outside of the drive cam 11 such that it can rotate relative to the drive cam 11. The control shaft 13 extends along the direction in which the cylinders 104 are arranged so as to be substantially parallel to the intake valve drive shaft 3. The circular control cam 14 is fixed to the control shaft 13 in an eccentric manner. The rocker arm 15 is fitted onto the outside of the control cam 14 such that it can rotate relative to the control cam 14 and coupled to a tip end of the ring-shaped link 12 at one end thereof. The rod-shaped link 16 is coupled to the rocking cam 4 and to the other end of the rocker arm 15. The control shaft 13 is rotationally driven within a prescribed control range by an electromotive actuator 17, the movement of the actuator 17 being transmitted to the control shaft 13 through a gear train 18.

Thus, when the intake valve drive shaft 3 rotates due to the rotation of the crankshaft, the drive cam 11 causes the ring-shaped link 12 to move in a substantially translational direction and the rocker arm 15 rocks about the center axis of the control cam 14. As a result, the rod-shaped link 16 causes the rocking cam 4 to rock and open and close the intake valves 2.

By changing the rotational angle of the control shaft 13, the position of the center axis of the control cam 14, which serves as the rocking center of the rocker arm 15, is changed and the posture of the rocking cam 4 changes. As a result, the intake valve working angle and the lift amount are changed in a continuously variable manner while the intake center phase remains substantially constant.

Since the connecting portions of the various members of the working angle varying mechanism 10, e.g., the bearing portion of the drive cam 11 and the bearing portion of the control cam 14, are configured to be in a surface contact state, the connecting portions are easy to lubricate and exhibit excellent durability and reliability. Since the rocking cams 4 that drive the intake valves 2 are arranged so as to be coaxial with respect to the intake valve drive shaft 3, the control precision is superior to that of a mechanism in which, for example, the rocking cam is supported by a separate support shaft other than the intake valve drive shaft 3. Additionally, the apparatus itself is more compact and possesses excellent engine mounting characteristics. More specifically, the apparatus can be employed in a direct drive valve train without making major modifications to the layout. Furthermore, since a return spring or other spring loading means is not required, friction in the valve train can be held to a low level. Of course, it will be apparent to those skilled in the art from this disclosure that other type of conventional variable valve operating mechanism can be utilized for the intake valve operating mechanism 100 explained above as long as such mechanism is configured and arranged to continuously vary the intake valve working angle and the working center angle of the intake valves 2.

Figure 4:
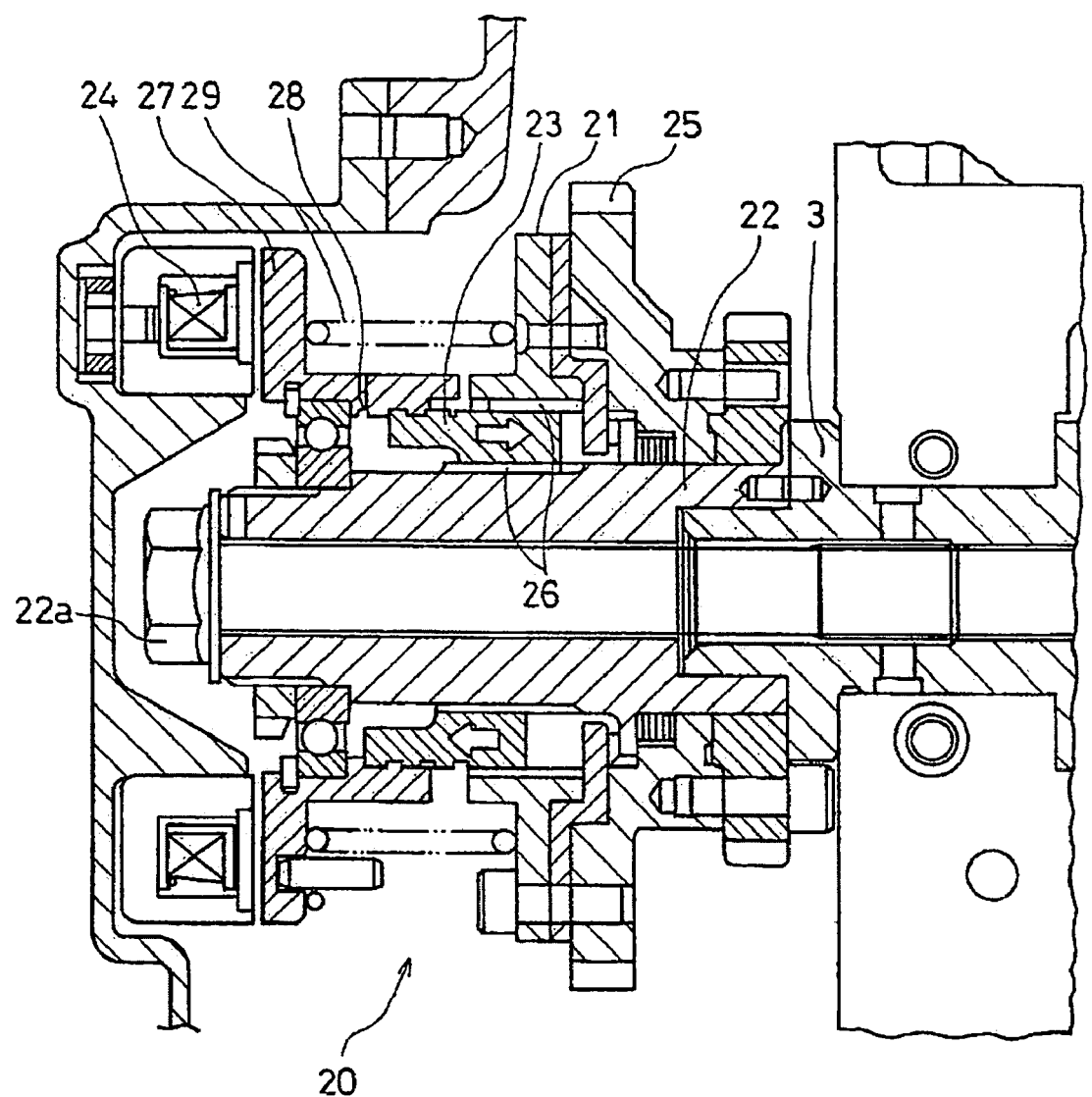
FIG. 4 is an enlarged cross sectional view of a phase varying mechanism of the variable valve operating mechanism illustrated in FIG. 2 in accordance with the preferred embodiment of the present invention.

FIG. 4 is a cross sectional view of the phase varying mechanism 20. As seen in FIG. 4, the phase varying mechanism 20 preferably comprises a first rotary body 21, a second rotary body 22, cylindrical intermediate gear 23, an electromagnetic retarder 24 and a cam sprocket 25. The first rotary body 21 is fixed to the cam sprocket 25 that rotates in synchronization with the crankshaft of the engine 1 and is configured to rotate as an integral unit with the cam sprocket 25. The second rotary body 22 is fixed to one end of the intake valve drive shaft 3 with a bolt 22a and rotates as an integral unit with the intake valve drive shaft 3. The cylindrical intermediate gear 23 meshes with the radially inwardly facing surface of the first rotary body 21 and the radially outwardly facing surface of the second rotary body 22 by the helical splines 26.

The drum 27 is coupled to the intermediate gear 23 through a triple threaded screw 28 and a torsional spring 29 is arranged between the drum 27 and the intermediate gear 23. The intermediate gear 23 is spring loaded in the retardation direction (i.e., the direction of more retarded angles, i.e., the leftward direction in FIG. 4) by the torsional spring 29 and is moved in the advancement direction (i.e., the rightward direction in FIG. 4) by the drum 27 and the triple threaded screw 28 when a voltage is applied to the electromagnetic retarder 24 so as to generate a magnetic force. Depending on the axial position of the intermediate gear 23, the relative positions of the first and second rotary bodies 21 and 22 change, and thus, the phase of the intake valve drive shaft 3 relative to the crankshaft changes. Thus, the phase varying mechanism 20 is configured to change the working center angle of the intake valves 2 by changing the phase of the drive shaft 3 with respect to the crankshaft. Of course, it will be apparent to those skilled in the art from this disclosure that any conventional variable valve operating mechanism that is configured to change the phase of the drive shaft 3 with respect to the cam sprocket can be used as the phase varying mechanism 20. The electromagnetic retarder 24 is controlled (driven) by a control signal from the ECU 30 in accordance with the operating conditions of the engine 1.

The ECU 30 is configured to execute such general engine controls as fuel injection control and ignition timing control based on the angles of the intake valve drive shaft 3 and the control shaft 13 detected by angle detection sensors 31 and 32 (shown in FIG. 2) and such engine operating conditions as the crank angle, the engine rotational speed, the load, and the engine temperature (which are detected with sensors or estimated). Additionally, the ECU 30 is configured to control the intake valve working angle (valve lift amount) of the intake valves 2 and the intake center phase (valve timing) of the intake valves 2 by controlling the intake valve operating mechanism 100.

More specifically, the ECU 30 is configured to compute and set a target torque tTe to be generated by the engine 1 based on such operating characteristics as the engine rotational speed Ne and the accelerator depression amount APO. Then, the ECU 30 is configured to operate the intake valve operating mechanism 100 and the throttle valve 102 based on the target torque tTe computed. In other words, the ECU 30 is configured to calculate a target fresh air quantity tQCYL required to reach the target torque tTe and set a target intake valve working angle tθeven based on the target fresh air quantity tQCYL. The ECU 30 is then configured to operate the intake valve operating mechanism 100 based on the target intake valve working angle tθeven. The ECU 30 is also configured to estimate a revised actual intake air quantity rQCYL that is actually drawn into the cylinder 104 and to operate the throttle valve 102 to such a position as to reduce the difference (=tQCYL−QCYL) between the revised actual intake air quantity rQCYL and the target fresh air quantity tQCYL, thereby adjusting the intake air pressure PMAN.

In the present invention, the ECU 30 is configured to use a reference intake air quantity QD, a theoretical maximum intake air quantity QMAX, and an actual cylinder intake air quantity QCYL to establish a function of the ratio QD/QMAX and the ratio QCYL/QMAX that uniquely determines each value of the ratio QD/QMAX with respect to the ratio QCYL/QMAX and uniquely determines each value of the ratio QCYL/QMAX with respect to the ratio QD/QMAX, and to use the function to control the engine 1. The reference intake air quantity QD corresponds to an intake air quantity resulting when the air is taken into the cylinder 104 hypothetically as a sonic flow with an intake valve opening area corresponding to the valve characteristic of the intake valves 2. The maximum intake air quantity QMAX is a theoretical intake air quantity resulting when the cylinder stroke volume from the start timing of the intake stroke to the end timing of the intake stroke is filled with intake air at the intake air pressure existing upstream of the intake valves 2. The actual cylinder intake air quantity QCYL is an intake air quantity corresponding to the valve characteristics of the intake valves 2.

The inventors of the present invention have discovered that when the reference intake air quantity QD and the maximum intake air quantity QMAX defined as described above are used, the ratio QCYL/QMAX of the actual cylinder intake air quantity QCYL with respect to the maximum intake air quantity QMAX is determined uniquely with respect to the ratio QD/QMAX of the reference intake air quantity QD with respect to the maximum intake air quantity QMAX. In the present invention, the ratio QD/QMAX constitutes a first value, and the ratio QCYL/QMAX constitutes a second value.

As a result, even when the valve timing or other characteristics of the intake valves 2 are varied under transient operating conditions of the engine 1, a function of the ratio QCYL/QMAX versus the ratio QD/QMAX can be used to estimate the actual cylinder intake air quantity QCYL with a high degree of accuracy and optimum fuel injection control can be accomplished with good response, thereby improving the operating performance and exhaust performance of the engine 1. Additionally, since the QCYL/

CMAX can be determined uniquely based on the ratio QD/QMAX using a two-dimensional map, even if the number of parameters is large, the actual cylinder intake air quantity QCYL can be estimated with a minimum number of computations without using multiple maps. As a result, the required ROM capacity and the number of adaptation steps are suppressed.

Additionally, in the present invention, the start timing of the intake stroke used to calculate the reference intake air quantity QD and the maximum intake air quantity QMAX is determined by taking into consideration a delay time required for the pressure inside the cylinder 104 to decrease from a pressure substantially equal to the exhaust pressure during the overlapping period (i.e., when the intake valves 2 and the exhaust valves 5 are both open) to a pressure substantially equal to the intake air pressure upstream of the intake valves 2. Therefore, the reference intake air quantity QD and the maximum intake air quantity QMAX can be determined more accurately and the actual cylinder intake air quantity QCYL can be estimated with a high degree of accuracy.

Furthermore, in the present invention, a different calculation method (revision method) is applied to the actual cylinder intake air quantity QCYL to determine the revised actual intake air quantity rQCYL depending on whether the engine 1 is operating in a first region in which the flow of intake air is choked (i.e., in a region where the intake flow drawn into the cylinder 104 is substantially sonic flow) or a second region that includes all other regions (i.e., in a region where state in the cylinder 104 changes in a quasi-statical manner). More specifically, the internal combustion engine control apparatus of the present invention is preferably configured to set a revision amount for the actual cylinder intake air quantity QCYL to substantially 0 when the engine 1 is operating in the first region, and to revise the actual cylinder intake air quantity QCYL by taking into account the effects of intake air pulsation. In other words, when the engine 1 is operating in the second region, the actual cylinder intake air quantity QCYL is revised based on a characteristic that is proportional to the actual intake air pressure that takes into account the air column vibration and proportional to the inverse of the actual intake air temperature that takes into account the air column vibration. Therefore, the actual cylinder intake air quantity QCYL can be revised accurately in a manner that is well suited to each operating region. In particular, when the engine 1 is operating in the second region, an accurate calculation of the revised actual intake air quantity rQCYL that takes into account the effects of intake air pulsation can be accomplished in a simple manner.

Referring now to FIGS. 5 to 10, the calculation of the revised actual intake air quantity rQCYL that is performed during the intake air quantity control executed by the ECU 30 will now be described in more detail.

Figure 5:
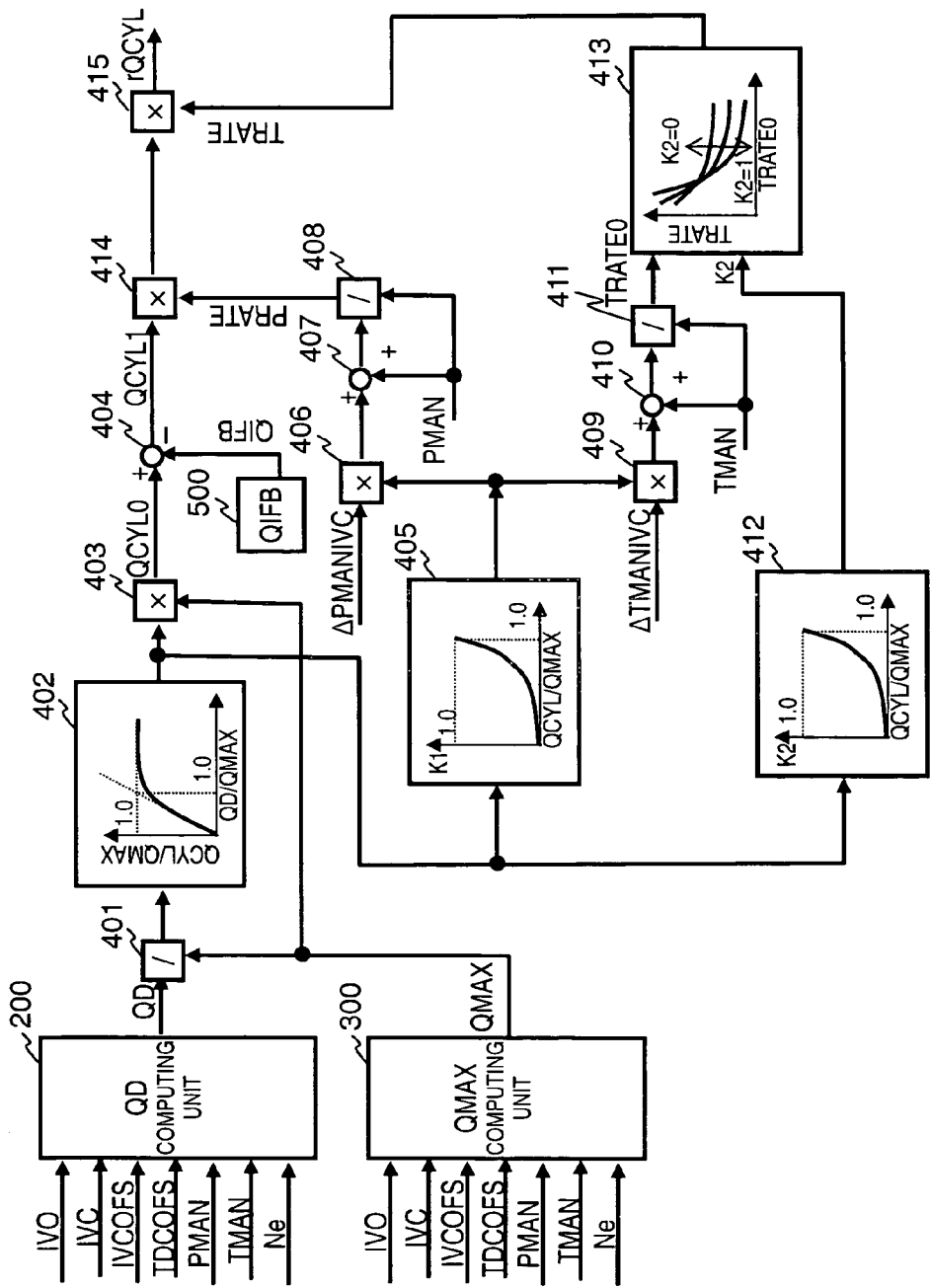
FIG. 5 is a main block diagram of the control steps executed in the internal combustion engine control apparatus in order to estimate a cylinder intake air quantity in accordance with the preferred embodiment of the present invention.

FIG. 5 shows a main block diagram of the control steps executed in the ECU 30 in order to estimate the revised actual intake air quantity rQCYL.

As seen in FIG. 5, a QD computing unit 200 (a reference intake air quantity calculating section) is configured to receive the intake valve open timing IVO, the intake valve close timing IVC, the overlap center angle O/LCA, the top dead center offset amount TDCOFS, the intake air pressure (average value of pressure in manifold) PMAN, the intake air pressure (average value of temperature in manifold) TMAN, and the engine rotational speed NE, and to compute the reference intake air quantity QD. As mentioned above, the reference intake air quantity QD corresponds to an intake air quantity obtained when the air is hypothetically calculated to be drawn into the cylinder 104 as a sonic flow with an intake valve opening area corresponding to the valve characteristics of the intake valves 2.

More specifically, the reference intake air quantity QD is calculated using the equation (1) shown below.

$$QD = \left(\sum AIV\right) \times \frac{PMAN}{\sqrt{Ra \times TMAN}} \times \sqrt{\frac{2\kappa}{\kappa-1} \times \left\{\left(\frac{PCYL}{PMAN}\right)^{\frac{2}{\kappa}} - \left(\frac{PCYL}{PMAN}\right)^{\frac{\kappa+1}{\kappa}}\right\}} \times \Delta t \quad \text{Equation (1)}$$

In Equation (1), AIV is the intake valve opening area detected per prescribed crank angle $\Delta\theta$ and $\Sigma AIV$ is the integral value (summation) of the AIV values. In other words, $\Sigma AIV$ is the total opening area of the intake port 101a during the period when the intake valves 2 are open (i.e., the summation of the opening areas AIV per unit crank angle) with the prescribed crank angle $\Delta\theta$ being the angular interval over which the opening areas AIV are summed (integrated). Ra is the gas constant of air, k is the specific heat ratio of air and TMAN is temperature of the intake air. A value $\Delta t$ is obtained when the prescribed crank angle $\Delta\theta$ is converted into a time value and is calculated with the equation $\Delta t = \Delta\theta/(6 \times Ne)$.

In the present invention, a cylinder pressure Pctr, which would be obtained at a working center angle IVctr (FIG. 8) of the intake valves 2 when change of state in the cylinder 104 during the intake stroke is assumed to occur due to adiabatic expansion, is used as the cylinder pressure PCYL in the equation (1) above. The cylinder pressure PCYL (=Pctr) defined in this manner can easily be calculated using a theoretical equation of thermodynamics. When the pressure Pctr obtained under the assumption of adiabatic expansion conditions is used as the cylinder pressure PCYL as explained above, the flow of intake air is theoretically choked over the entire operating region (all operating regions) of the engine 1 and the intake air can be assumed to flow into the cylinder at the speed of sound (sonic speed). As a result, the pressure ratio PCYL/PMAN in the equation (1) can be assumed to always correspond to a critical pressure ratio ($=[2/(\kappa+1)]^{\kappa/(\kappa-1)}$), which is constant. Thus, with regards to the equation (1) above, a theoretical sonic flow state exists in which the flow speed of the intake air passing through the intake valves 2 is constant at the speed of sound. Thus, the reference intake air quantity QD calculated in equation (1) corresponds to a hypothetical sonic intake air quantity.

As explained above, in the sonic flow state, the ratio of the cylinder pressure PCYL to the intake air pressure PMAN (PCYL/PMAN) in the equation (1) is a value equal to or below the critical pressure ratio. In other words, the ratio of the pressures just upstream and just downstream of the intake valves 2 is held constant at the critical pressure ratio. Therefore, the third element of the right side of the equation (1) can be simplified to a fixed value (constant) qSONIC because the critical pressure ratio of the air is constant (PCYL/PMAN=$[2/(\kappa+1)]^{\kappa/(\kappa-1)}$).

Thus, the equation (1) can be rewritten as the equation (2) shown below.

$$QD = \left(\sum AIV\right) \times \frac{PMAN}{\sqrt{Ra \times TMAN}} \times qSONIC \times \Delta t \quad \text{Equation (2)}$$

Figure 6:
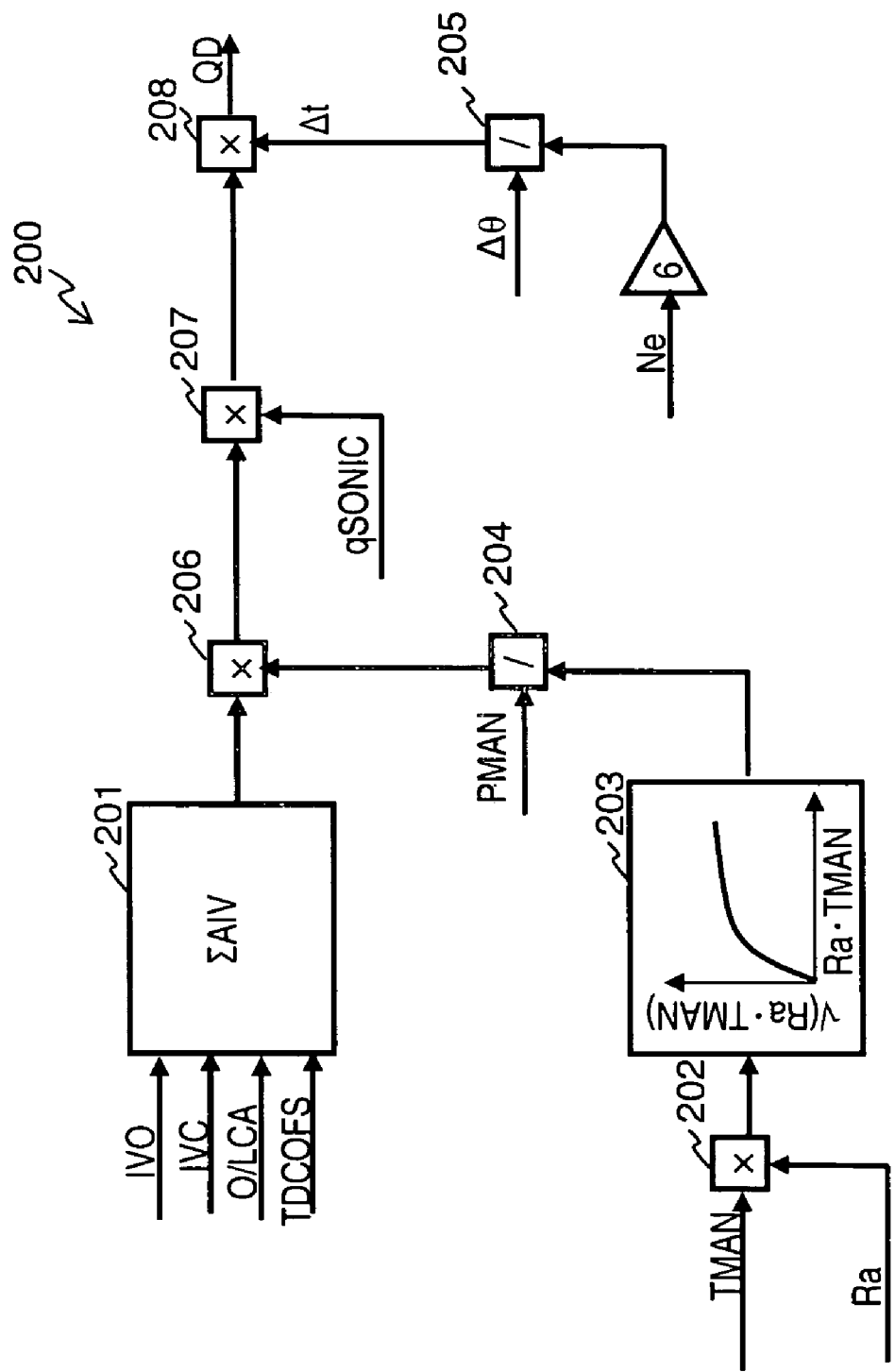
FIG. 6 is a block diagram of the computation steps executed by a reference intake air quantity computing unit of the internal combustion engine control apparatus in accordance with the preferred embodiment of the present invention.

FIG. 6 is a block diagram illustrating the computation steps executed by the QD computing unit 200 to calculate the reference intake air quantity QD.

As seen in FIG. 6, an opening area integrating unit 201 is configured to receive the intake valve open timing IVO and the intake valve close timing IVC, and to determine the valve characteristics of the intake valves 2 that includes the valve lift amount. The intake valve opening timing IVO and intake valve close timing IVC can be derived from the intake valve working angle and the working center angle determined the last (previous) time the computation was executed (i.e., the previous control cycle).

Then, the opening area integrating unit 201 is configured to calculate the effective top dead center (hereinafter referred as "effective TDC") where the intake stroke actually starts due to adiabatic change based on the overlap center angle O/LCA and the top dead center offset amount TDCOFS. The overlap center angle O/LCA is the crank angle where the difference between the lift amount of the intake valves 2 and the lift amount of the exhaust valves 5 is substantially zero or smallest. In this embodiment of the present invention, the overlap center angle O/LCA can be derived from the intake valve working angle and the working center angle because the valve timing of the exhaust valves 5 is fixed.

The opening area integrating unit 201 is also configured to calculate the intake valve opening area AIV per unit crank angle ($\Delta\theta$) during the period when the intake valves 2 are open between the effective TDC and the intake valve close timing IVC based on the valve characteristics of the intake valves 2. Then, the opening area integrating unit 201 is configured to calculate the opening area integral value $\Sigma AIV$ by integrating (summing) the individually calculated AIV values. In the present invention, a calculation period PRDQD (FIG. 8) for calculating the total opening area $\Sigma AIV$ portion of the equation (1) above is set to the period from the effective TDC to the intake valve close timing IVC of the intake valves 2 corresponding to the valve characteristics. The method of calculating the effective TDC will be described in more detail later.

As seen in FIG. 6, the QD computing unit 200 is configured to multiply the intake air temperature TMAN by the gas constant Ra (control step 202), to determine the square root thereof (i.e., $(TMAN \times Ra)^{1/2}$) by referring to a map (control step 203), and to divide the intake air pressure PMAN by the square root value $((TMAN \times Ra)^{1/2})$ (control step 204). In this way, the second portion of the right side of the equation (2) above $(PMAN/(TMAN \times Ra)^{1/2})$ is calculated.

Additionally, the QD computing unit 200 is configured to divide the prescribed crank angle $\Delta\theta$ by the product of the engine rotational speed Ne and 6 (i.e., 6×Ne) to calculate the integration time interval $\Delta t$ (control step 205).

Then, by successively multiplying the intake valve opening area integral value $\Sigma AIV$, the value $PMAN/(TMAN \times Ra)^{1/2}$, the constant qSONIC, and the integration time interval $\Delta t$ calculated as described above in control steps 206 to 208, the QD computing unit 200 is configured to calculate the reference cylinder intake air quantity QD in accordance with the equation (2) above.

Referring back to FIG. 5, similarly to the QD computing unit 200, a QMAX computing unit 300 (a maximum intake air quantity calculating section) is configured to receive the intake valve open timing IVO, the intake valve close timing IVC, the IVC offset amount IVCOFS, the top dead center offset amount TDCOFS, the intake air pressure PMAN, the intake air pressure TMAN, and the engine rotational speed Ne, and to compute the intake air quantity QMAX as described below.

Figure 7:
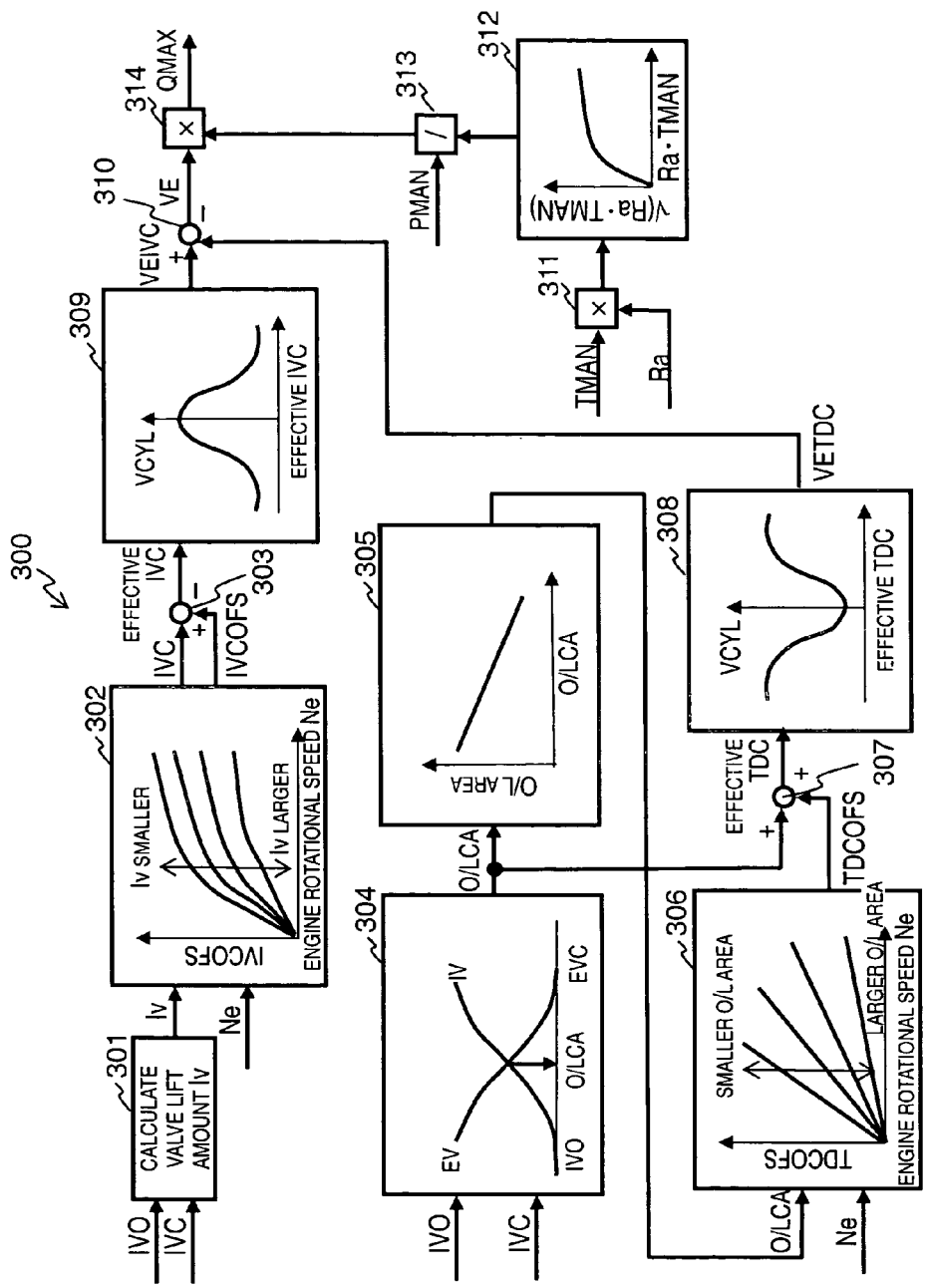
FIG. 7 is a block diagram of the computation steps executed by a maximum intake air quantity computing unit of the internal combustion engine control apparatus in accordance with the preferred embodiment of the present invention.

FIG. 7 is a block diagram illustrating the computation steps executed by the QMAX computing unit 300 to calculate the maximum intake air quantity QMAX.

As mentioned above, the maximum intake air quantity QMAX is defined as the theoretical intake air quantity resulting when the cylinder stroke volume from the start timing of the intake stroke to the end timing of the intake stroke is filled with intake air at the intake air pressure (or density) and temperature of the intake air existing upstream of the intake valves 2. In other words, the maximum intake air quantity QMAX corresponds to the maximum air intake theoretically possibly drawn into the cylinder 104 during the intake stroke in view of the valve timing characteristics of the intake valves 2. From a static point of view, the stroke volume is the value obtained by subtracting the cylinder volume at the top dead center point TDC from the cylinder volume at the intake valve close timing IVC. However, in reality, the start timing of the intake stroke and the end timing of the intake stroke do not occur simultaneously with the top dead center point TDC and the intake valve close timing IVC, respectively.

Figure 8:
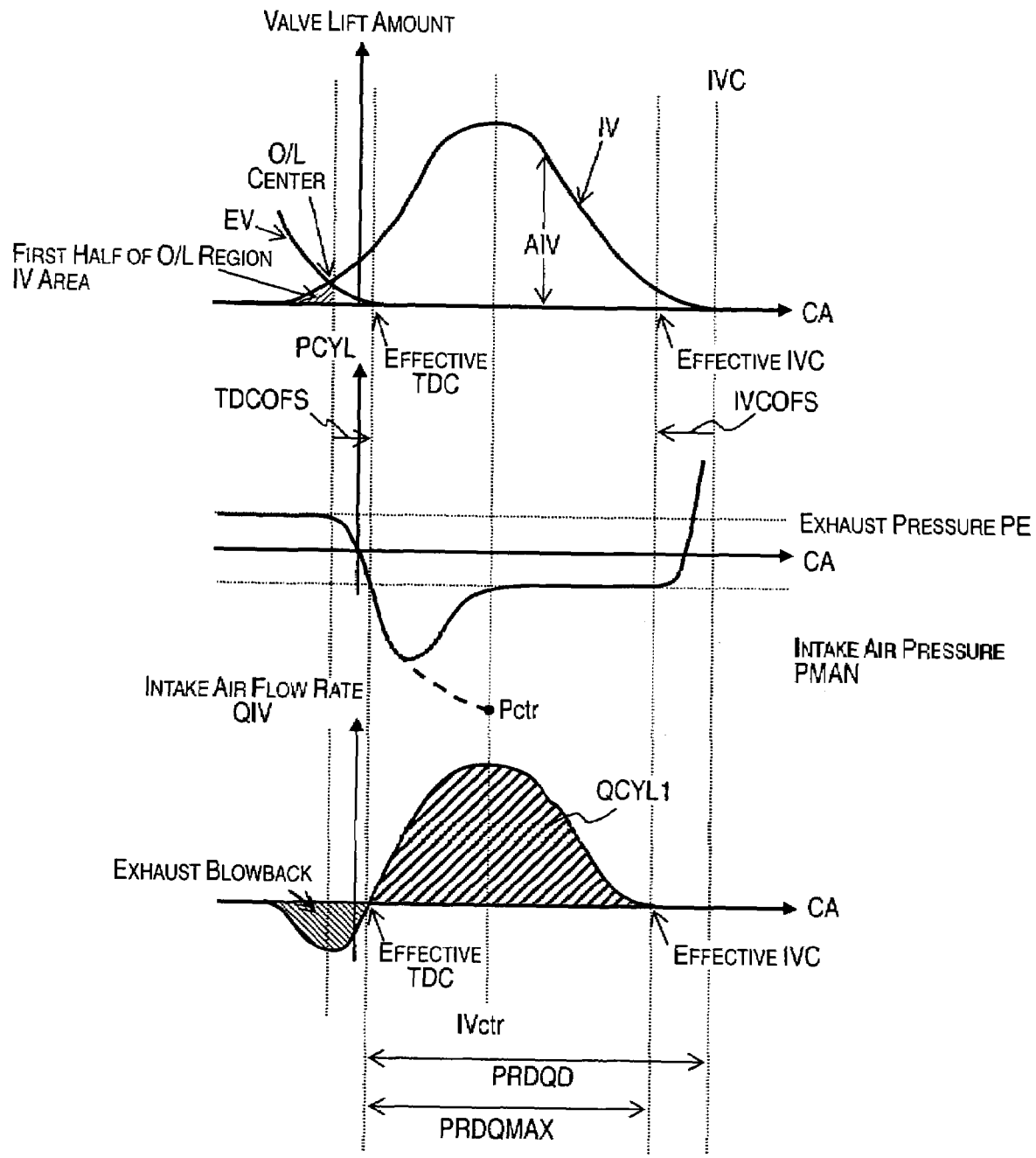
FIG. 8 is a diagrammatic time chart showing how valve characteristics, a cylinder pressure, and a flow rate of air through an intake valve vary during an intake stroke in an internal combustion engine.

For example, FIG. 8 is a time chart illustrating the relationships between the crank angle CA and the intake valve lift amount IV (one of the valve characteristics) of the intake valves 2 and the exhaust valve lift amount EV of the exhaust valves 5, the cylinder pressure PCYL, and the flow rate QIV of air through the intake valves 2 (the cylinder intake air quantity per unit crank angle) during the intake stroke. FIG. 8 illustrates a case in which the intake valve close timing IVC is controlled to occur after bottom dead center.

As shown in FIG. 8, the pressure inside the cylinder (cylinder pressure PCYL) reaches the air intake pressure PMAN before the intake valve close timing IVC is reached. Also, the adiabatic compression effect or change starts (i.e., the intake stroke ends) before the intake valve close timing IVC is reached. In other words, an actual end timing of the intake stroke is offset (advanced) by an IVC offset amount IVCOFS (an intake end timing offset value) from the intake valve close timing IVC. The IVC offset amount IVCOFS by which the actual end timing of the intake stroke precedes the intake valve close timing IVC increases as the engine rotational speed Ne increases and as the valve lift amount decreases because the effects of inertia increase.

Therefore, as shown in the block diagram of FIG. 7, the QMAX computing unit 300 is configured to first calculate the valve lift amount (maximum lift amount) Iv based on the valve characteristics of the intake valves 2 as determined based on the intake valve open timing IVO and the intake valve close timing IVC (control step 301).

Next, the QMAX computing unit 300 is then configured to read a map that plots the IVC offset amount IVCOFS (i.e., the amount by which the actual end timing of the intake stroke precedes the intake valve close timing IVC) versus the engine rotational speed Ne and the valve lift amount Iv and to refer to the map to find the IVC offset amount IVCOFS (control step 302). The map used in the control step 302 preferably has a characteristic so that the IVC offset amount IVCOFS is set to a larger value when the engine rotational speed Ne is higher and when the valve lift amount Iv of the intake valves 2 is smaller as shown in FIG. 7.

Then, the QMAX computing unit 300 is configured to subtract the IVC offset amount IVCOFS obtained from the map from the intake valve close timing IVC (control step 303) to calculate a crank angle position to be used as the effective IVC corresponding to when the intake stroke actually ends (i.e., the end timing of the intake stroke). In other words, in the present invention the effective IVC is calculated as a timing when the intake valve close timing IVC is advanced by the IVC offset amount IVCOFS.

Moreover, the deviation between the intake top dead center point TDC and the start timing of the intake stroke (i.e., the timing at which the cylinder pressure matches the intake air pressure PMAN and the intake stroke starts due to adiabatic expansion effect or change) occurs due to exhaust blowback caused by the valve overlap in which the intake valves 2 and the exhaust valves 5 are both open. In other words, as shown in FIG. 8, after the intake valves 2 open under the valve overlap condition, the pressure inside the cylinder 104 gradually decreases from the exhaust pressure PE and reaches the intake pressure PMAN at a timing that is later than the occurrence of the intake top dead center TDC. It is at this later timing that the intake stroke starts due to adiabatic expansion (i.e., the effective TDC). The pressure inside the cylinder 104 does not decrease much immediately after the intake valves 2 start to open because the opening area of the intake valves 2 is small. The significant decrease in the cylinder pressure begins in the vicinity of the overlap center angle O/LCA where the exhaust blowback flow rate is the largest as seen in FIG. 8. Thus, the effective TDC is determined based on the delay timing or offset amount (a TDC offset amount TDCOFS) between the overlap center angle O/LCA to the timing at which the cylinder pressure PCYL reaches the intake pressure PMAN. The amount by which the effective TDC (i.e., the actual timing at which the intake stroke starts) lags behind the timing at which the cylinder pressure starts to decrease (i.e., in the vicinity of the overlap center angle O/LCA) increases as the engine rotational speed Ne increases and as the valve overlap amount (overlap opening area) decreases because the effects of inertia increase and the degree of decline in the cylinder pressure diminishes.

Therefore, as shown in FIG. 7, the QMAX computing unit 300 is configured to read the intake valve opening timing IVO and the intake valve close timing IVC and to determine the valve overlap center angle O/LCA (control step 304). More specifically, the QMAX computing unit 300 is configured to determine the intake valve characteristic IV based on the intake valve opening timing IVO and the intake valve close timing IVC and to calculate the crank angle where the lift amounts of both the intake valve characteristic IV and the fixed exhaust valve characteristic EV are the same (i.e., the intersection point of the two characteristics). The calculated crank angle is used as the overlap center angle O/LCA.

Next, the QMAX computing unit 300 is configured to calculate the overlap opening area O/LA (=intake valve opening area=exhaust valve opening area) corresponding to the overlap center angle O/LCA by referring to a prescribed map (control step 305). The characteristic of the prescribed map used in the control step 305 is such that the smaller (i.e., more advanced) the overlap center angle O/LCA is, the larger the overlap opening area O/LA is.

Next, the QMAX computing unit 300 is configured to read a map that plots the TDC offset amount TDCOFS (an intake start timing offset value) (i.e., the amount the effective TDC lags behind the overlap center angle O/LCA) versus the engine rotational speed Ne and the overlap opening area O/LA and to find the TDC offset amount TDCOFS by referring to the map (control step 306). As seen in FIG. 7, the map used in the control step 306 preferably has a characteristic in which the TDC offset amount TDCOFS is set to a larger value when the engine rotational speed Ne is higher and when the overlap opening area O/LA during the overlapping period is smaller.

The QMAX computing unit 300 is then configured to add the TDC offset amount TDCOFS to the overlap center angle O/LCA to obtain the crank angle to be used as the effective TDC (control step 307). For the overlap opening area, it is also acceptable to use the integral value (ΣAIV) of the intake valve opening areas occurring during the period from the intake valve open timing IVC to the overlap center angle O/LCA. Such integral value is also used in the computation of the exhaust gas blowback amount described later.

Based on the effective TDC (i.e., the actual start timing of the intake stroke) and the effective IVC (i.e., the actual end timing of the intake stroke), the QMAX computing unit 300 is configured to calculate the maximum amount of air that can be drawn into the cylinder during the intake stroke (i.e., the maximum intake air quantity QMAX) using the equation (3) shown below.

$$QMAX = \frac{PMAN \times VEIVC}{\sqrt{Ra \times TMAN}} - \frac{PMAN \times VETCDC}{\sqrt{Ra \times TMAN}} \quad \text{Equation (3)}$$
$$= \frac{PMAN \times (VEIVC - VETDC)}{\sqrt{Ra \times TMAN}}$$

VEIVC: cylinder volume at the effective IVC

VETDC: cylinder volume at the effective TDC

As shown in FIG. 7, the QMAX computing unit 300 is configured to calculate the cylinder volume VETDC at the effective TDC based on the intake valve characteristics by acquiring the intake valve open timing IVO, the intake valve close timing IVC, and the effective TDC and referring to a map (control step 308). Similarly, the QMAX computing unit 300 is configured to calculate the cylinder volume VEIVC at the effective IVC by acquiring the intake valve open timing IVO, the intake valve close timing IVC, and the effective IVC and referring to a map (control step 309).

The QMAX computing unit 300 is then configured to calculate the effective stroke volume VE (=VEIVC−VETDC) by subtracting the cylinder volume VETDC from the cylinder volume VEIVC (control step 310).

Also, similarly to the calculation executed in the QD computing unit 200, the QMAX computing unit 300 is configured to multiply the intake air temperature TMAN by the gas constant Ra (control step 311), to determine the square root thereof (i.e., $(TMAN \times Ra)^{1/2}$) by referring to a map (control step 312), and to divide the intake air pressure PMAN by the square root value ($(TMAN \times Ra)^{1/2}$) (control step 313). Finally, the QMAX computing unit 300 is configured to calculate the maximum intake air quantity QMAX in accordance with the equation (3) above by multiplying $PMAN/(TMAN \times Ra)^{1/2}$ by the effective stroke volume VE (control step 314).

The inventors of the present invention have confirmed by experimentation, simulation, etc., that a parameter defined as the ratio of the actual cylinder intake air quantity QCYL to the maximum amount of air that can be drawn into the cylinder (i.e., the maximum intake air quantity QMAX) is determined uniquely with respect to a parameter defined as the ratio QD/QMAX of the reference intake air quantity QD and the maximum intake air quantity QMAX calculated as described in the preceding paragraphs (i.e., a parameter defined as the ratio of the amount of air drawn into the cylinder with sonic flow to the maximum amount of air that can be drawn into the cylinder 104 under conditions of the particular valve characteristics of the intake valves 2 in effect at that time). The expression "the ratio QCYL/QMAX is determined uniquely with respect to the ratio QD/QMAX" means that even if the individual values of the reference intake air quantity QD and the maximum intake air quantity QMAX vary due to differences in the valve timing, the valve lift amount and other valve characteristics, the ratio QCYL/QMAX will have the same value whenever the ratio QD/QMAX has the same value (i.e., each value of the ratio QCYL/QMAX will correspond to the same unique value of the ratio QD/QMAX, and vice versa, regardless of variations in the valve characteristics). Thus, the ratio QCYL/QMAX and the actual cylinder intake air quantity QCYL can be estimated by merely finding the reference intake air quantity QD and the maximum intake air quantity QMAX, and the actual cylinder intake air quantity QCYL can be estimated using a two-dimensional map with a minimum number of parameters.

Therefore, in the present invention, the relationship (function) between the ratio QCYL/QMAX and the ratio QD/QMAX is found in advance by experiment or simulation and a map plotting the ratio QCYL/QMAX versus the ratio QD/QMAX is prepared and preferably stored in the memory device (such as ROM) of the ECU 30. More specifically, in order to estimate the cylinder intake air quantity QCYL, the relationship between the reference cylinder intake air quantity QD calculated using the equations (1) shown above based on the cylinder pressure PCYL (=Pctr) and the actual cylinder intake air quantity QCYL is stored in the ECU 30 as dimensionless data using the theoretical maximum intake air quantity QMAX. In other words, a unique one-to-one relationship between the ratio of the reference cylinder intake air quantity QD to the theoretical maximum intake air quantity QMAX (the first value=QD/QMAX) and the ratio of the cylinder intake air quantity QCYL to the theoretical maximum intake air quantity QMAX (the second value=QCYL/QMAX) is created as table data (e.g., the table data shown in control step 402 of FIG. 5) and stored in the memory device of the ECU 30.

Returning to FIG. 5, the reference intake air quantity QD calculated by the QD computing unit 200 is divided by the maximum intake air quantity QMAX calculated by the QMAX computing unit 300 (control step 401) and the resulting value QD/QMAX is used as a parameter to search the map for the value of QCYL/QMAX (control step 402). Thus, the control step 402 constitutes at least part of an engine control section of the present invention.

Then, the actual cylinder intake air quantity QCYL is calculated by multiplying the value QCYL/QMAX obtained from the map by the calculated value of the maximum intake air quantity QMAX (control step 403) to obtain an initial actual cylinder intake air quantity QCYL0. The initial actual cylinder intake air quantity QCYL0 calculated in this manner is the amount of gas actually drawn into the cylinder 104 but it includes the exhaust blowback gas that returns to the cylinder 104 through the intake port 101a during the valve overlap period. In order to estimate the amount of fresh intake air that is required for the engine control, it is necessary to subtract a quantity equal to the amount of blown back exhaust gas.

Therefore, the ECU 30 is configured to calculate the exhaust blowback quantity QIFB in a QIFB computing unit 500 (an exhaust blowback revising section) as shown in FIG. 5.

Figure 9:
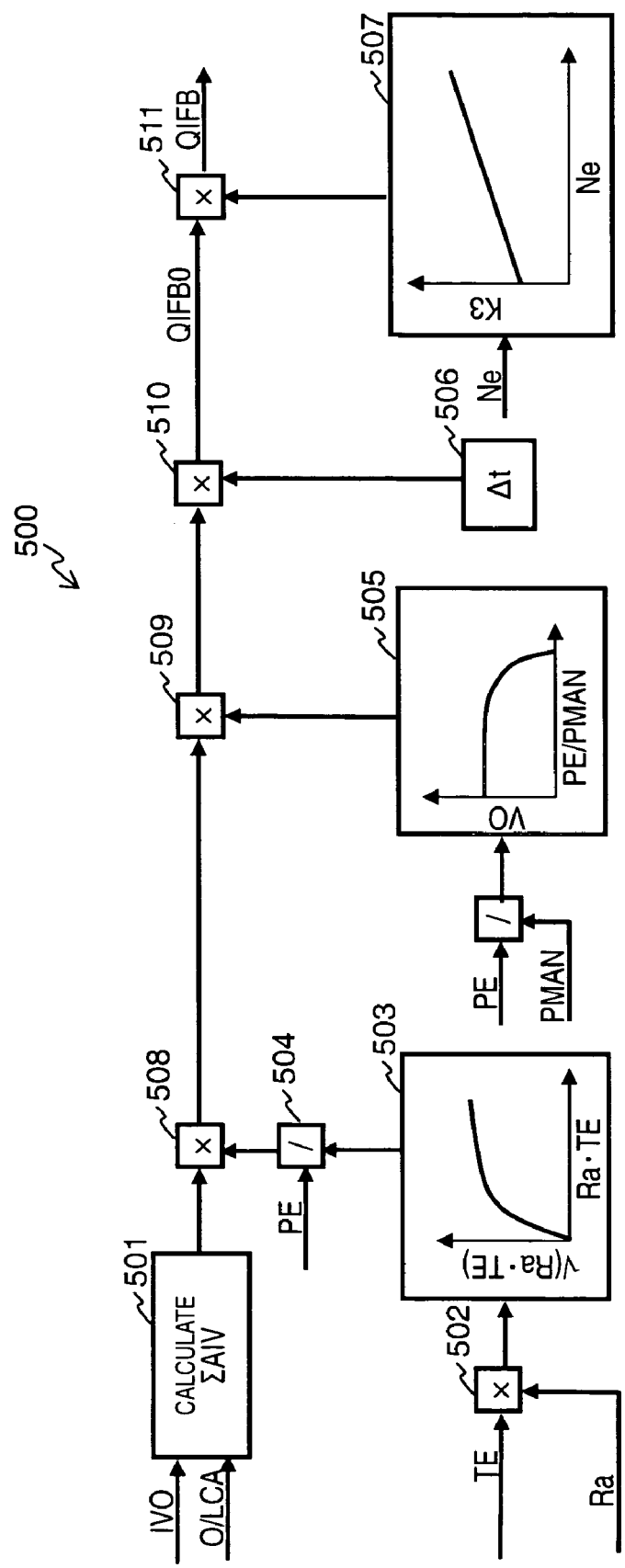
FIG. 9 is a block diagram of the computation steps executed in order to compute an exhaust blowback quantity in accordance with the preferred embodiment of the present invention.

FIG. 9 is a block diagram illustrating the computation steps executed by the QIFB computing unit 500 in order to calculate the exhaust blowback quantity QIFB.

Since it is substantially impossible to detect the consecutive changing pressure inside the cylinder 104, a reference value for the exhaust blowback quantity QIFB (a reference exhaust blowback quantity QIFB0) corresponding to a reference state is estimated and the reference exhaust blowback quantity QIFB0 is revised based on the operating conditions of the engine 1 in order to estimate the exhaust blowback quantity QIFB. The integral value (ΣAIV) of the intake valve opening areas AIV occurring during the period from the intake valve open timing IVC to the overlap center angle O/LCA is used as the opening area during the valve overlap period and the reference exhaust blowback quantity value QIFB0 corresponding to a state in which the pressure inside the cylinder 104 is assumed to equal the exhaust pressure PE is calculated using the equation (4) shown below. This equation is similar to the equation (1) explained above.

$$QIFB0 = \left(\sum AIV\right) \times \frac{PE}{\sqrt{Ra \times TE}} \times V_0 \times \Delta t \times K3 \quad \text{Equation (4)}$$

In the equation (4), $V_0$ is a flow rate coefficient defined as follows:

$$V_0 = \sqrt{\frac{2\kappa}{\kappa - 1} \times \left\{\left(\frac{PMAN}{PE}\right)^{\frac{2}{\kappa}} - \left(\frac{PMAN}{PE}\right)^{\frac{\kappa+1}{\kappa}}\right\}}$$

Here, again, when the ratio of the pressures just upstream and just downstream of the intake valves 2 are equal to or below a critical pressure, the pressure ratio PMAN/PE is replaced with the constant critical pressure ratio, and the value of $V_0$ becomes a fixed value corresponding to a sonic flow.

Then, as explained regarding the calculation of the effective TDC, the higher the engine rotational speed Ne is, the later the timing at which the cylinder pressure decreases from the exhaust pressure PE will be and the larger the exhaust blowback amount will tend to be.

As shown in FIG. 9, the QIFB computing unit 500 is configured to first calculate the integral value (ΣAIV) of the intake valve opening areas AIV occurring during the period from the intake valve open timing IVC to the overlap center angle O/LCA (control step 501).

Next, the QIFB computing unit 500 is configured to multiply the exhaust gas temperature TE by the gas constant Ra (control step 502), to determine the square root thereof (i.e., $(TE \times Ra)^{1/2}$) by referring to a map (control step 503), and to divide the exhaust pressure PE by the square root value $((TE \times Ra)^{1/2})$ (control step 504), thereby calculating the second portion $(PE/(TE \times Ra)^{1/2})$ of the right side of the equation (4). The average pressure and average temperature inside the exhaust passage 107 per cycle are preferably used as the exhaust pressure PE and the exhaust gas temperature TE, respectively.

Using the pressure ratio PMAN/PE as a parameter, the QIFB computing unit 500 is then configured to calculate the flow rate coefficient $V_0$ by referring to a map that plots the flow rate coefficient $V_0$ versus the pressure ratio PMAN/PE (control step 505).

Similarly to the calculation of the reference intake quantity QD explained above, the prescribed crank angle $\Delta\theta$ is divided by the product of the engine rotational speed Ne and 6 (i.e., 6×Ne) to calculate the integration time interval $\Delta t$ (=$\Delta\theta$/(6×Ne)) (control step 506).

The QIFB computing unit 500 is also configured to calculate a revision coefficient K3 by referring to a map based on the engine rotational speed Ne (control step 507). The coefficient K3 is preferably set to a value that is equal to or larger than 1 and proportional to the engine rotational speed Ne as seen FIG. 9.

Then, the QIFB computing unit 500 is configured to calculate the reference exhaust blowback quantity QIFB0 by successively multiplying the intake valve opening area integral value $\Sigma$AIV, the value PE/(TE×Ra)$^{1/2}$, the constant $V_0$, and the integration time interval $\Delta t$ calculated as described above (control steps 508 to 510) and to calculate the final exhaust blowback quantity QIFB by multiplying the reference exhaust blowback quantity QIFB0 by the revision coefficient K3 (control step 511).

Referring back to FIG. 5, the ECU 30 is configured to calculate a cylinder fresh air intake quantity QCYL1 by subtracting the exhaust blowback quantity QIFB from the initial actual cylinder intake air quantity QCYL0 (control step 404).

Although the calculated fresh air intake quantity QCYL1 corresponds to the quantity of fresh air taken into the cylinder 104, the computation described above uses an average of a plurality of detection values for the manifold intake air pressure PMAN, and thus, the change in the manifold intake air pressure PMAN resulting from intake air pulsation has been smoothed. In other words, the fresh air intake quantity QCYL1 is calculated as a static cylinder air quantity based on the intake air pressure PMAN and the intake pressure PCYL.

In actual practice, the intake air pressure PMAN changes due to intake air pulsation and the intake air temperature TMAN also changes accordingly. Since the amount of fresh air taken into the cylinder changes as a result of these changes in the intake air pressure PMAN and the intake air temperature TMAN, the fresh air intake quantity can be estimated more precisely by applying a revision that compensates for the intake air pulsation. Thus, in order to calculate the revised actual cylinder intake air quantity rQCYL, the ECU 30 is configured to apply a revision to the fresh intake air quantity QCYL1 based on an amount of change in the cylinder intake air quantity resulting from intake air pulsation.

In the present invention, the cylinder intake air quantity characteristic is defined in two different characteristics depending on the operating regions of the engine 1, i.e., whether the engine 1 is operating in the first region in which the flow of intake air is choked (the sonic flow state) or the second region comprising all regions other than the first region. In the second region, change in the state or conditions inside the cylinder 104 is assumed to be proceed in a quasi-static manner. Thus, the ECU 30 is configured to revise the fresh intake air quantity QCYL1 by using different revision characteristics depending on whether the engine 1 is operating in the first region or the second region.

The control steps for compensating for the intake air pulsation will now be described.

Firstly, a flow rate $\Delta$QCYL per unit time $\Delta t$ of the intake air passing through the intake valve 2 is expressed with the following equation (5).

$$\Delta QCYL = AIV \times \frac{PMAN}{\sqrt{Ra \times TMAN}} \times \sqrt{\frac{2\kappa}{\kappa-1} \times \left\{\left(\frac{PCYL}{PMAN}\right)^{\frac{2}{\kappa}} - \left(\frac{PCYL}{PMAN}\right)^{\frac{\kappa+1}{\kappa}}\right\}} \quad \text{Equation (5)}$$

The actual cylinder fresh air intake quantity QCYL is calculated by integrating $\Delta$QCYL values calculated during the intake stroke.

In the first region in which the flow rate $\Delta$QCYL per unit time $\Delta t$ corresponds to a sonic flow, the ratio of the pressures immediately upstream and downstream of the intake valve 2 (i.e., (PCYL/PMAN) in the above equation (5)) is fixed at the critical pressure ratio without being affected by intake air pressure change resulting from intake air pulsation. Thus, the third element (square root portion) of the equation (5) above will be a fixed (constant) value. As a result, the following relationship expressed by the equation (6) below will exist in the first region.

$$QCYLfst \propto PMAN \times (TMAN)^{-\frac{1}{2}} \quad \text{Equation (6)}$$

The equation (6) above indicates that the cylinder intake air quantity in the first region QCYLfst is proportional to the intake air pressure PMAN and proportional to the inverse of the square root of the intake air temperature TMAN.

On the other hand, in the second region in which the cylinder volume changes in a quasi-static manner while the flow speed $\Delta$QCYL/AIV is close to 0, the pressure and temperature inside the cylinder 104 at the end of the intake stroke (when the intake valve 2 closes) are equal to the intake air pressure and intake air temperature inside the intake manifold. Thus, the relationship expressed in the equation (7) below is obvious based on the equation of state of a gas under the assumption that at the intake valve close timing IVC the cylinder is filled with intake air at the density and temperature of the intake air inside the air intake passage 101. In other words, when the cylinder intake air quantity in the second region QCYLscd is expressed in the equation of state based on the assumption of these conditions, the following relationship results if the intake air pressure change $\Delta$PMANIVC and the intake air temperature change $\Delta$TMANIVC resulting from intake air pulsation are taken into account.

$$QCYLscd \propto (PMAN+\Delta PMANIVC) \times (TMAN+\Delta TMANIVC)^{-1} \quad \text{Equation (7)}$$

The equation (7) above indicates that the cylinder intake air quantity in the second region QCYLscd is proportional to the actual intake air pressure that takes into account the air column vibration (PMAN+$\Delta$PMANIVC) and proportional to the inverse of an actual intake air temperature that takes into account the air column vibration (TMAN+$\Delta$TMANIVC). In the equation (7) above, PMAN and TMAN are average or representative pressure and temperature values and $\Delta$PMANIVC and $\Delta$TMANIVC are amounts of change of the intake air pressure PMANIVC and the intake air temperature TMANIVC at the intake valve close timing IVC with respect to the average intake air pressure PMAN and average intake air temperature TMAN. In this embodiment, the symbol $\propto$ means that the value on the left side of the equation is proportional to the value on the right side of the equation.

Figure 10:
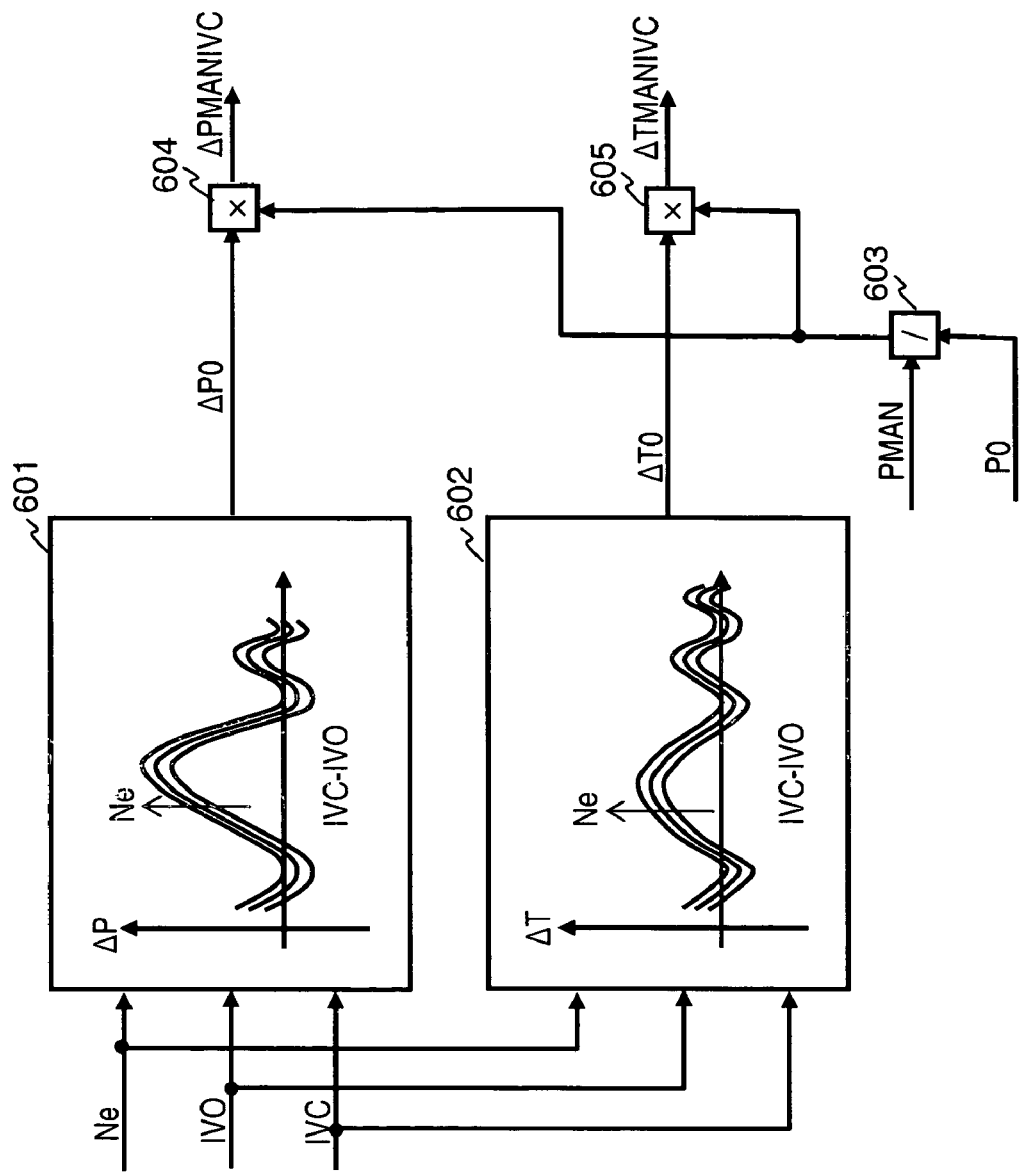
FIG. 10 is a block diagram illustrating the computation steps executed in order to compute an intake air pressure change amount and an intake air temperature change amount in accordance with the preferred embodiment of the present invention.

FIG. 10 is a block diagram illustrating the computation steps executed by the ECU 30 in order to compute the intake air pressure change $\Delta$PMANIVC and the intake air temperature change $\Delta$TMANIVC.

Reference values $\Delta$P0 and $\Delta$T0 for the intake pressure change and the intake temperature change, respectively, are calculated by referring to maps (control steps 601 and 602) prepared in advance based on a simulation. The maps used in these control steps 601 and 602 are configured to use the engine rotational speed Ne and the difference (i.e., the intake valve working angle) (IVC−IVO) obtained by subtracting the intake valve open timing IVO from the intake valve close timing IVC as parameters. The reference values $\Delta$P0 and $\Delta$T0 are both multiplied by the pressure ratio PMAN/P0 (control steps 603 to 605) as a load ratio (where PMAN is the intake air pressure in the manifold and P0 is the atmospheric pressure) to calculate the intake air pressure change $\Delta$PMANIVC and the intake air temperature change $\Delta$TMANIVC. Thus, the reference values $\Delta$P0 and $\Delta$T0 are revised based on the actual intake air pressure PMAN and the actual intake air temperature TMAN, respectively, to calculate the intake air pressure change $\Delta$PMANIVC and the intake air temperature change $\Delta$TMANIVC, respectively.

Then, a single characteristic (a third characteristic) that encompasses both the first characteristic expressed in the equation (6) and the second characteristic expressed in the equation (7) to cover the entire operating region (including the first and second regions) of the engine 1 is approximated in a manner most likely to be accurate. More specifically, the general equation (8) (shown below) expressing the intake air quantity in all regions QCYLall including the sonic flow state expressed in the equation (6) above and the quasi-statically changing state expressed in the exhaust (7) above can be obtained by setting revision coefficients K1 and K2. The revision coefficient K1 serves to compensate for the fact that the amount of change resulting from intake pulsation increases as the intake state shifts from the sonic flow state expressed by the equation (6) to the quasi-statically changing state expressed by the equation (7). The revision coefficient K2 serves to smooth the transition from the sonic flow state expressed by the equation (6) to the quasi-statically changing state expressed by the equation (7). In this embodiment, the revision coefficients K1 and K2 are variable in accordance with the state of the intake air flow. Each of the revision coefficients K1 and K2 is preferably equal to or larger than 0 and smaller than or equal to 1. The values of the revision coefficients K1 and K2 are preferably set in accordance with the ratio of the cylinder intake air quantity QCYL to the theoretical maximum intake air ratio QMAX such that the larger the ratio QCYL/QMAX is, the larger the values to which the revision coefficients K1 and K2 are set.

$$QCYLall \propto (PMAN + K1 \times \Delta PMANIVC) \times$$
$$(TMAN + K1 \times \Delta TMANIVC)^{-\frac{1}{(2-K2)}} \quad \text{Equation (8)}$$

On the other hand, the equation (9) for calculating the fresh intake air quantity QCYL1 when intake air pulsation is not taken into account (i.e., when the intake air pressure change $\Delta$PMANIVC and the intake air temperature change $\Delta$TMANIVC are 0) can be obtained from the above general equation (8) as follows.

$$QCYL1 \propto PMAN \times TMAN^{-\frac{1}{(2-K2)}} \quad \text{Equation (9)}$$

Based on the equations (8) and (9) above, the following relationship can be obtained.

$$QCYLall = QCYL1 \times \left[\frac{(PMAN + K1 \times \Delta PMANIVC)}{PMAN}\right] \times$$
$$\left[\frac{(TMAN + K1 \times \Delta TMANIVC)}{TMAN}\right]^{-\frac{1}{(2-K2)}}$$

Then, a revision amount PRATE and a revision amount TRATE are defined as follows:

$$PRATE = \frac{(PMAN + K1 \times \Delta PMANIVC)}{PMAN}$$

$$TRATE = \left[\frac{(TMAN + K1 \times TMANIVC)}{TMAN}\right]^{-\frac{1}{(2-K2)}}$$

Thus, the same relationship in equation (9) can be expressed as in the equation (10) to obtain the revised actual cylinder intake quantity rQCYL as follows.

$$rQCYL = QCYL1 \times PRATE \times TRATE \quad \text{Equation (10)}$$

Returning to FIG. 5, the ECU 30 is configured to calculate the revision coefficient K1 corresponding to the intake air pulsation by referring to a map (control step 405) based on the ratio QCYL/QMAX obtained from the map as described previously. As shown in FIG. 5, the revision coefficient K1 is equal to or larger than 0 and smaller than or equal to 1 and set so as to increase in a second order manner with respect to the ratio QCYL/QMAX as the state change inside the cylinder 104 approaches being a quasi-static change.

Then, the ECU 30 is configured to multiply the intake air pressure change amount $\Delta$PMANIVC by the revision coefficient K1 (control step 406), to add the value of (K1×$\Delta$PMANIVC) to the intake air pressure PMAN (control step 407), and to divide the value of (PMAN+K1×$\Delta$PMANIVC) by the intake air pressure PMAN (control step 408), thereby calculating the revision amount PRATE configured to compensate for the change in the intake air pressure.

On the other hand, the ECU 30 is configured to multiply the intake air temperature change amount $\Delta$TMANIVC by the revision coefficient K1 (control step 409), to add the value of (K1×$\Delta$TMANIVC) to the intake air temperature TMAN (control step 410), and to divide the value of (TMAN+K1×$\Delta$TMANIVC) by the intake air temperature TMAN (control step 410), thereby calculating a basic temperature revision amount TRATE0 corresponding to the change in the intake air temperature.

The ECU 30 is also configured to calculate the revision coefficient K2 for smoothing the transition from the sonic flow region to the quasi-static change region by referring to a map based on QCYL/QMAX (control step 412). The revision coefficient K2 is equal to or larger than 0 and smaller than or equal to 1 and set so as to increase in a second order manner with respect to the ratio QCYL/QMAX.

Then, based on the basic temperature revision amount TRATE0 and the revision coefficient K2, the ECU 30 is configured to calculate the value of the basic temperature revision amount TRATE0 raised to the power $[-1/(2-K2)]$ by referring to a map (control step 413) and thereby calculating the revision amount TRATE configured to compensate for the change in the intake air temperature.

The revised actual cylinder fresh air intake quantity rQCYL that has been revised to compensate for changes resulting from intake air pulsation is calculated by multiplying the revision amount PRATE (control step 414) and the revision amount TRATE (control step 415) by the fresh cylinder air intake quantity QCYL1 (which was obtained by subtracting the exhaust blowback quantity QIFB from the initial actual cylinder intake air quantity QCYL0). Thus, the control steps 405 to 415 of FIG. 5 preferably constitutes an intake air pulsation revising section of the present invention.

Accordingly, with the internal combustion engine control apparatus described above, a function of the ratio QCYL/QMAX versus the ratio QD/QMAX can be used to estimate the quantity of air drawn into the cylinder 104 of the engine 1 (the actual cylinder intake air quantity QCYL) with a high degree of accuracy even when the valve timing or other valve characteristics is varied under transient operating conditions. As a result, optimum fuel injection control can be accomplished with good response, thereby improving the operating performance and exhaust performance of the engine 1. Also, since the ratio QCYL/QMAX can be calculated uniquely with respect to QD/QMAX using a two-dimensional map, even if the number of parameters is large, the actual cylinder intake air quantity QCYL can be estimated with a minimum amount of computations without using multiple maps, thereby suppressing the ROM capacity and number of adaptive steps.

Moreover, since a different characteristic of revising the actual cylinder intake air quantity QCYL is used depending on whether the engine is operating in the first region where the flow of intake air is choked or the second region where the state in the cylinder 104 changes in the quasi-static manner, the actual cylinder intake air quantity QCYL can be revised more accurately and easily in a manner that is well suited to each operating region. In short, an accurate revised actual cylinder intake air quantity rQCYL that takes into account the effects of intake air pulsation can be calculated in a simple manner with the present invention.

Furthermore, the revision coefficients K1 and K2 that are variable in accordance with the intake air flow conditions are used to set the revision amounts PRATE and TRATE that can be used over the entire operating region (including the first and second regions) of the engine 1. Thus, the revision of the actual intake air quantity QCYL can be accomplished using a single equation regardless of whether choking is occurring (whether the engine is operating in the first region or not). Therefore, the use of multiple maps to estimate the intake air quantity can avoided. As a result, the computational load required to calculate the revised actual cylinder intake air quantity rQCYL can be reduced.

Also, by defining the reference intake air quantity QD (which corresponds to the sonic flow) and the theoretical maximum intake air quantity QMAX and establishing a unique one-to-one relationship between the reference intake air quantity QD, the maximum intake air quantity QMAX, and the cylinder intake air quantity QCYL, the actual cylinder intake air quantity QCYL can be calculated independently of the valve timing based on the relationship during actual operation of the engine 1. As a result, the computational load required to calculate the cylinder intake air quantity QCYL can be reduced.

With the present invention, the revised actual cylinder intake air quantity rQCYL can be calculated even more accurately by subtracting the blowback gas quantity QIFB from the calculated initial actual cylinder intake air quantity QCYL0 to obtain the fresh intake air quantity QCYL1.

As used herein to describe the above embodiment, the term "detect" as used to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An internal combustion engine control apparatus for an engine having a variable valve operating mechanism configured and arranged to vary valve characteristics of an intake valve of the engine, the internal combustion engine control apparatus comprising:

reference intake air quantity calculating means for calculating a reference intake air quantity corresponding to when an intake air is taken in a cylinder as a sonic flow with an intake valve opening area corresponding to the valve characteristics of the intake valve;

maximum intake air quantity calculating means for calculating a theoretical maximum intake air quantity corresponding to when a cylinder stroke volume from a start timing to an end timing of an intake stroke is filled with intake air at an intake air pressure existing upstream of the intake valve; and engine control means for controlling the engine by using an intake air quantity function between a first value obtained by dividing the reference intake air quantity by the maximum intake air quantity and a second value obtained by dividing an actual intake air quantity corresponding to the valve characteristics of the intake valve by the maximum intake air quantity, with each value of the first value being uniquely determined with respect to the second value and each value of the second value being uniquely determined with respect to first value.

2. A method of estimating a cylinder intake air quantity drawn into a cylinder of an engine having a variable valve operating mechanism configured and arranged to vary valve characteristics of an intake valve of the engine, the method comprising:

calculating a reference intake air quantity corresponding to when an intake air is taken in a cylinder as a sonic flow with an intake valve opening area corresponding to the valve characteristics of the intake valve;

calculating a theoretical maximum intake air quantity corresponding to when a cylinder stroke volume from a start timing to an end timing of an intake stroke is filled with intake air at an intake air pressure existing upstream of the intake valve; and controlling the engine by using an intake air quantity function between a first value obtained by dividing the reference intake air quantity by the maximum intake air quantity and a second value obtained by dividing an actual intake air quantity corresponding to the valve characteristics of the intake valve by the maximum intake air quantity, the controlling of the engine being performed by uniquely determining each value of the first value with respect to the second value and uniquely determining each value of the second value with respect to first value.

3. The method as recited in claim 2, further comprising establishing a first characteristic of the actual intake air quantity when the engine is operating in a first region such that the first characteristic is proportional to an intake air pressure and proportional to an inverse of a square root of an intake air temperature;

establishing a second characteristic of the actual intake air quantity when the engine is operating in a second region such that the second characteristic is proportional to an actual intake air pressure that takes into account an air column vibration and proportional to an inverse of an actual intake air temperature that takes into account the air column vibration;

approximating the first and second characteristics to obtain a third characteristic of the actual intake air quantity that can be used when the engine is operating in one of the first and second regions; and establishing a revision characteristic for revising the actual intake air quantity based on a ratio between an intake air quantity obtained by the third characteristic with taking into account the air column vibration and an intake air quantity obtained by the third characteristic with assuming a change amount according to the air column vibration being zero.

4. An internal combustion engine control apparatus for an engine having a variable valve operating mechanism configured and arranged to vary valve characteristics of an intake valve of the engine, the internal combustion engine control apparatus comprising:

a reference intake air quantity calculating section configured to calculate a reference intake air quantity corresponding to when an intake air is taken in a cylinder as a sonic flow with an intake valve opening area corresponding to the valve characteristics of the intake valve;

a maximum intake air quantity calculating section configured to calculate a theoretical maximum intake air quantity corresponding to when a cylinder stroke volume from a start timing to an end timing of an intake stroke is filled with intake air at an intake air pressure existing upstream of the intake valve; and an engine control section configured to control the engine by using an intake air quantity function between a first value obtained by dividing the reference intake air quantity by the maximum intake air quantity and a second value obtained by dividing an actual intake air quantity corresponding to the valve characteristics of the intake valve by the maximum intake air quantity, the engine control section being configured to uniquely determine each value of the first value with respect to the second value and to uniquely determine each value of the second value with respect to first value.

5. The internal combustion engine control apparatus as recited in claim 4, wherein the maximum intake air quantity calculating section is further configured to determine an effective intake valve close timing corresponding to when adiabatic compression starts inside the cylinder as the end timing of the intake stroke.

6. The internal combustion engine control apparatus as recited in claim 5, wherein the maximum intake air quantity calculating section is further configured to calculate the effective intake valve close timing by revising an actual intake valve close timing by an intake end timing offset value calculated based on an engine rotational speed and a valve lift amount of the intake valve.

7. The internal combustion engine control apparatus as recited in claim 4, wherein the engine control section is further configured to calculate the first value with the reference intake air quantity and the maximum intake air quantity calculated based on an operation condition of the engine, to find the second value from a map of the intake air quantity function using the first value as a parameter, and to determine the actual intake air quantity by multiplying the second value by the maximum intake air quantity.

8. The internal combustion engine control apparatus as recited in claim 4, further comprising an exhaust blowback revising section configured to calculate an exhaust blowback quantity corresponding to an amount of exhaust gas that is blown back during an overlapping period when the intake valve and an exhaust valve are both open, and to calculate a fresh intake air quantity corresponding solely to an amount of fresh air taken into the cylinder by subtracting the exhaust blowback quantity from the actual intake air quantity calculated by multiplying the first value by the maximum intake air quantity.

9. The internal combustion engine control apparatus as recited in claim 4, further comprising an intake air pulsation revising section configured to revise the actual intake air quantity calculated using the intake air quantity function in accordance with an intake air pulsation to obtain a revised intake air quantity.

10. The internal combustion engine control apparatus as recited in claim 9, wherein the intake air pulsation revising section is further configured to revise the actual intake air quantity to estimate the revised intake air quantity by using a different revision characteristic depending on whether the engine is operating in a first region in which intake air flow toward the cylinder is choked or in a second region that is different from the first region.

11. The internal combustion engine control apparatus as recited in claim 10, wherein
the intake air pulsation revising section is further configured to use a revision characteristic in which a revision amount of the actual intake air quantity according to the intake pulsation is substantially zero when the engine is operating in the first region.

12. The internal combustion engine control apparatus as recited in claim 10, wherein
the intake air pulsation revising section is further configured to use a revision characteristic in which a revision amount of the actual intake air quantity is proportional to an actual intake air pressure that takes into account an air column vibration and proportional to an inverse number of an actual intake air temperature that takes into account the air column vibration when the engine is operating in the second region.

13. The internal combustion engine control apparatus as recited in claim 10, wherein
the reference intake air quantity calculating section is configured to calculate the reference intake air quantity as an amount of intake air taken into the cylinder during a period between an effective top dead center at which a cylinder pressure decreases to an intake air pressure and an intake valve close timing corresponding to the valve characteristics.

14. The internal combustion engine control apparatus as recited in claim 10, wherein
the maximum intake air quantity calculating section is configured to calculate the maximum intake air quantity as an amount of intake air taken into the cylinder during a period between an effective top dead center at which the cylinder pressure decreases to the intake air pressure and an effective intake valve close timing at which compression of the intake air inside the cylinder substantially starts.

15. The internal combustion engine control apparatus as recited in claim 10, further comprising
an exhaust blowback revising section configured to calculate an exhaust blowback quantity corresponding to an amount of exhaust gas that is blown back to an intake passage during an overlapping period when the intake valve and an exhaust valve are both open, and to calculate a fresh intake air quantity corresponding solely to an amount of fresh air taken into the cylinder by subtracting the exhaust blowback quantity from the actual intake air quantity.

16. The internal combustion engine control apparatus as recited in claim 10, wherein
the intake air pulsation revising section is configured to calculate the revised intake air quantity as follows:

$$rQCYL = QCYL1 \times PRATE \times TRATE$$

$$PRATE = \frac{(PMAN + K1 \times \Delta PMANIVC)}{PMAN}$$

$$TRATE = \left\{ \frac{(TMAN + K1 \times \Delta TMANIVC)}{TMAN} \right\}^{-\frac{1}{(2-K2)}}$$

where
rQCYL is the revised intake air quantity,
QCYL1 is the actual intake air quantity,
PRATE is a pressure revision coefficient,
TRATE is a temperature revision coefficient,
PMAN is a representative intake air pressure,
TMAN is a representative intake air temperature,
ΔPMANIVC is a change amount of the intake air pressure with respect to the representative intake air pressure PMAN at an intake valve close timing corresponding to the valve characteristics,
ΔTMANIVC is a change amount of the intake air temperature with respect to the representative intake air temperature TMAN at the intake valve close timing corresponding to the valve characteristics,
K1 is a revision coefficient that is equal to or larger than 0 and smaller than or equal to 1, and
K2 is a revision coefficient that is equal to or larger than 0 and smaller than or equal to 1.

17. The internal combustion engine control apparatus as recited in claim 4, wherein
the reference intake air quantity calculating section is configured to calculate the reference intake air quantity using at least the start timing of the intake stroke, and
the maximum intake air quantity calculating section is configured to calculate the maximum intake air quantity using at least the start timing of the intake stroke,
the reference intake air quantity calculating section and the maximum intake air quantity calculating section being further configured to determine the start timing of the intake stroke based at least on a delay time required for a pressure inside the cylinder to decrease from a value substantially equal to an exhaust pressure during an overlapping period when the intake valve and an exhaust valve are both open to a value substantially equal to an intake air pressure upstream of the intake valve.

18. The internal combustion engine control apparatus as recited in claim 17, wherein
the reference intake air quantity calculating section and the maximum intake air quantity calculating section are configured to determine an effective top dead center at which the pressure inside the cylinder reaches the value substantially equal to the intake air pressure upstream of the intake valve as the start timing of the intake stroke.

19. The internal combustion engine control apparatus as recited in claim 18, wherein
the reference intake air quantity calculating section and the maximum intake air quantity calculating section are configured to calculate an intake start timing offset value indicative of an offset amount by which the start timing of the intake stroke is offset from an overlap center angle at which valve lift amounts of the intake valve and the exhaust valve are substantially equal based on the engine rotational speed and an overlap opening area during the overlapping period, and to calculate the start timing of the intake stroke based on the intake start timing offset value.

20. The internal combustion engine control apparatus as recited in claim 17, wherein
the engine control section is further configured to calculate the first value with the reference intake air quantity and the maximum intake air quantity calculated based on an operation condition of the engine, to find the second value from a map of the intake air quantity function using the first value as a parameter, and to determine the actual intake air quantity by multiplying the second value with the maximum intake air quantity.

21. The internal combustion engine control apparatus as recited in claim 20, further comprising
an exhaust blowback revising section configured to calculate an exhaust blowback quantity corresponding to an amount of exhaust gas that is blown back during the overlapping period, and to calculate a fresh intake air quantity corresponding solely to an amount of fresh air taken into the cylinder by subtracting the exhaust blowback quantity from the actual intake air quantity calculated by multiplying the first value by the maximum intake air quantity.

22. The internal combustion engine control apparatus as recited in claim 21, wherein the exhaust blowback revising section is further configured to calculate a reference exhaust blowback quantity based on an exhaust temperature, an exhaust pressure, and an overlap opening area during the overlapping period, and to calculate the exhaust blowback quantity by revising the reference exhaust blowback quantity using a revision amount that is set based on the engine rotational speed.

23. The internal combustion engine control apparatus as recited in claim 17, further comprising an intake air pulsation revising section configured to revise the fresh intake air quantity calculated using the intake air quantity function in accordance with an intake air pulsation to estimate a revised intake air quantity.

* * * * *